United States Patent [19]

Hehl

[11] Patent Number: 4,737,095
[45] Date of Patent: Apr. 12, 1988

[54] COMPONENT CHANGING APPARATUS SERVING A GROUP OF INJECTION MOLDING MACHINES

[76] Inventor: Karl Hehl, Arthur-Hehl-Strasse 32, D-7298 Lossburg 1,, Fed. Rep. of Germany

[21] Appl. No.: 51,387

[22] Filed: May 19, 1987

[30] Foreign Application Priority Data

May 21, 1986 [DE] Fed. Rep. of Germany ....... 3617094
Aug. 5, 1986 [DE] Fed. Rep. of Germany ....... 3626488

[51] Int. Cl.$^4$ ............................................. B29C 45/06
[52] U.S. Cl. ..................................... 425/190; 72/482; 414/744 R; 425/195
[58] Field of Search ............... 425/182, 190, 193, 195; 72/481, 482; 414/744 R

[56] References Cited

U.S. PATENT DOCUMENTS

| | | | |
|---|---|---|---|
| 3,134,350 | 5/1964 | Danly et al. | 100/918 |
| 3,722,255 | 3/1973 | Martin | 100/918 |
| 3,825,245 | 7/1974 | Osburn et al. | 414/744 R |
| 3,986,617 | 10/1976 | Blomquist | 414/744 R |
| 4,099,901 | 7/1978 | Shuman | 425/193 |
| 4,126,233 | 11/1978 | Jeske | 414/744 |
| 4,152,978 | 5/1979 | Abe et al. | 100/918 |
| 4,156,962 | 6/1979 | Haller | 100/918 |
| 4,402,657 | 9/1983 | Laghi | 425/190 |
| 4,462,783 | 7/1984 | Hehl | 425/190 |
| 4,472,127 | 9/1984 | Cyriax et al. | 425/190 |
| 4,518,338 | 5/1985 | Hehl | 425/190 |
| 4,555,228 | 11/1985 | Nishiike et al. | 425/190 |
| 4,575,328 | 3/1986 | Fierkens et al. | 425/193 |
| 4,595,090 | 6/1986 | Ottowell | 425/182 |
| 4,671,755 | 6/1987 | Graae | 425/190 |
| 4,690,626 | 9/1987 | Krzepinski | 425/88 |

FOREIGN PATENT DOCUMENTS

| | | |
|---|---|---|
| 69221 | 5/1982 | European Pat. Off. . |
| 92686 | 3/1983 | European Pat. Off. . |
| 1629746 | 2/1971 | Fed. Rep. of Germany . |
| 1654737 | 1/1972 | Fed. Rep. of Germany . |
| 2410484 | 1/1977 | Fed. Rep. of Germany . |
| 2736315 | 5/1980 | Fed. Rep. of Germany . |
| 3220911 | 10/1983 | Fed. Rep. of Germany . |
| 3242169 | 7/1984 | Fed. Rep. of Germany . |
| 3242054 | 10/1985 | Fed. Rep. of Germany . |

Primary Examiner—Willard Hoag
Attorney, Agent, or Firm—Spencer & Frank

[57] ABSTRACT

A component changing apparatus which serves a group of injection molding machines has a transport carriage arranged for travel on a carriage track oriented parallel to the injection axis of each injection molding machine, between a storage magazine and a selected injection molding machine. A platform is mounted on the transport carriage for rotation through at least 180° about a vertical axis. The platform defines an emplacement for holding a mold to be carried by the transport carriage. A mold guide is mounted on the platform for guiding the mold for a horizontal displacement into and out of the emplacement of the platform. Transport tracks are formed by the mold guides on the carriage and on the respective mold changing table and by the mold guides on the carriage and in a selected storage compartment when the transport carriage is in a coupling position adjacent one of the mold changing tables or the storage magazine, respectively. There is further provided a mold shifting device mounted on the transport carriage for moving a mold between one of the storage compartments and the emplacement of the transport carriage or between the emplacement of the transport carriage and an emplacement of one of the mold changing tables, dependent on a coupling position of the transport carriage.

23 Claims, 29 Drawing Sheets

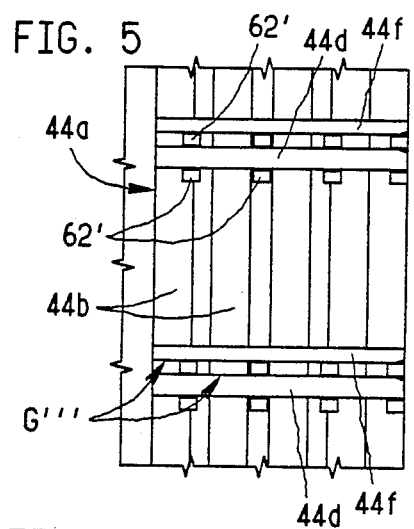
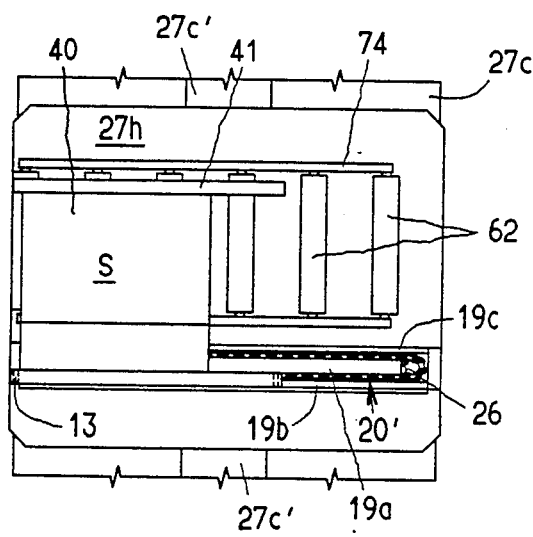
FIG. 5
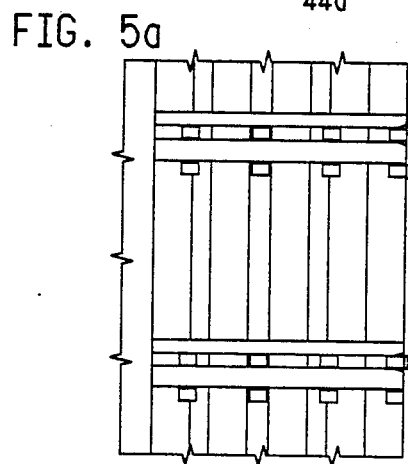
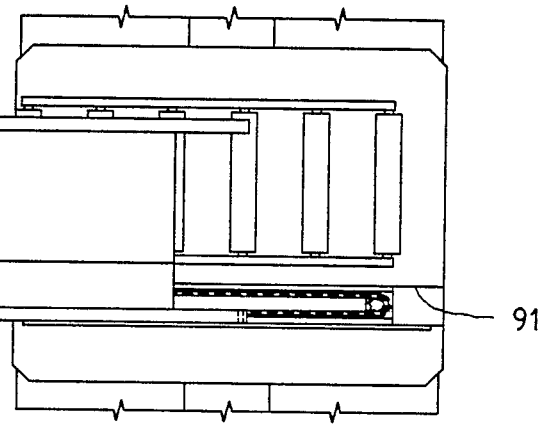
FIG. 5a
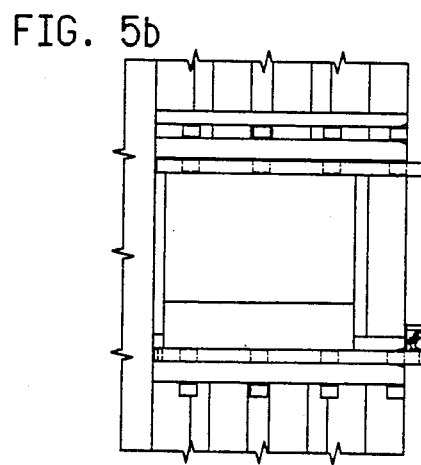
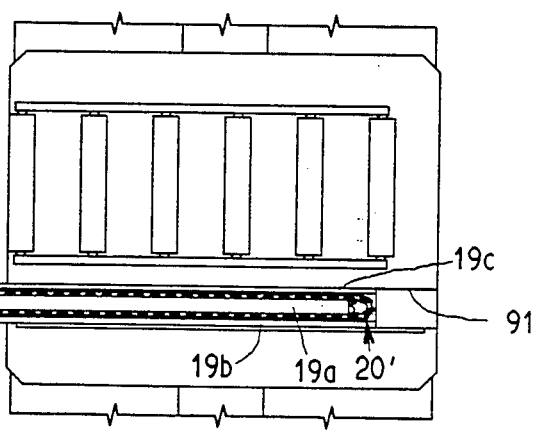
FIG. 5b

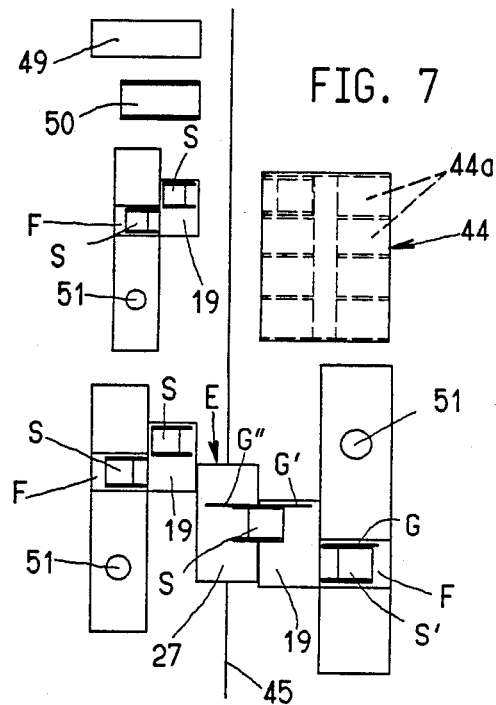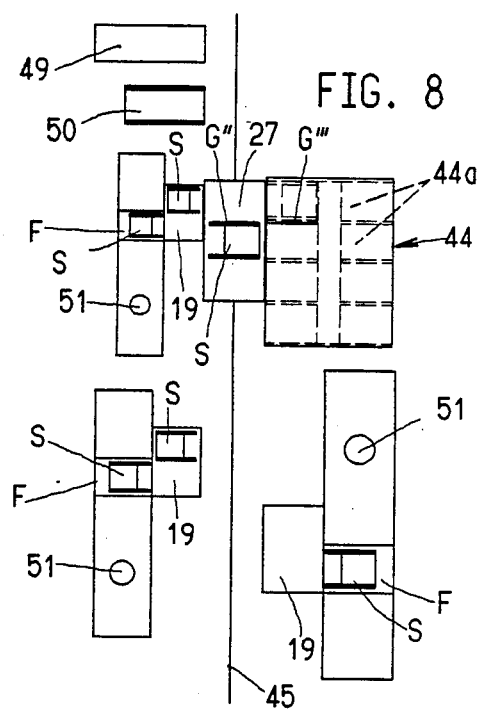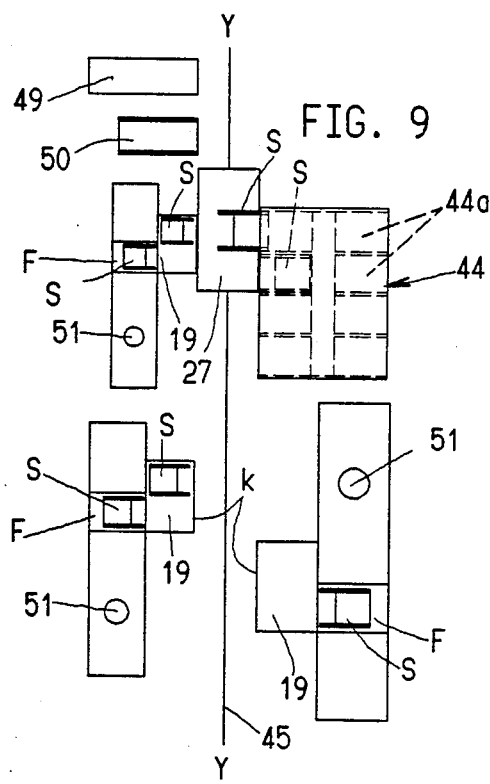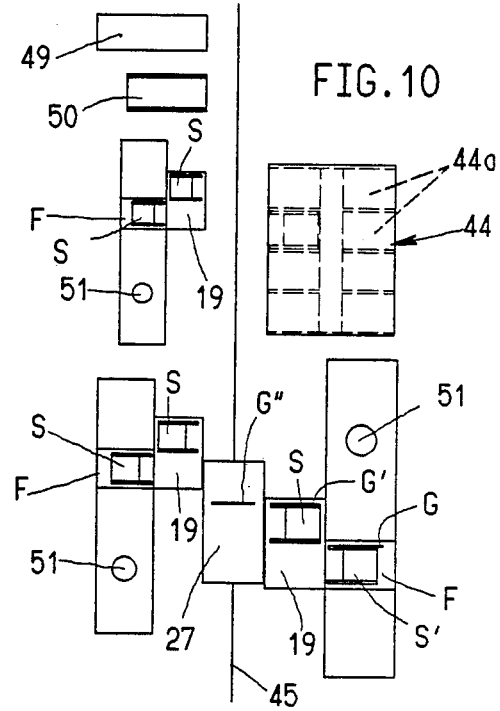

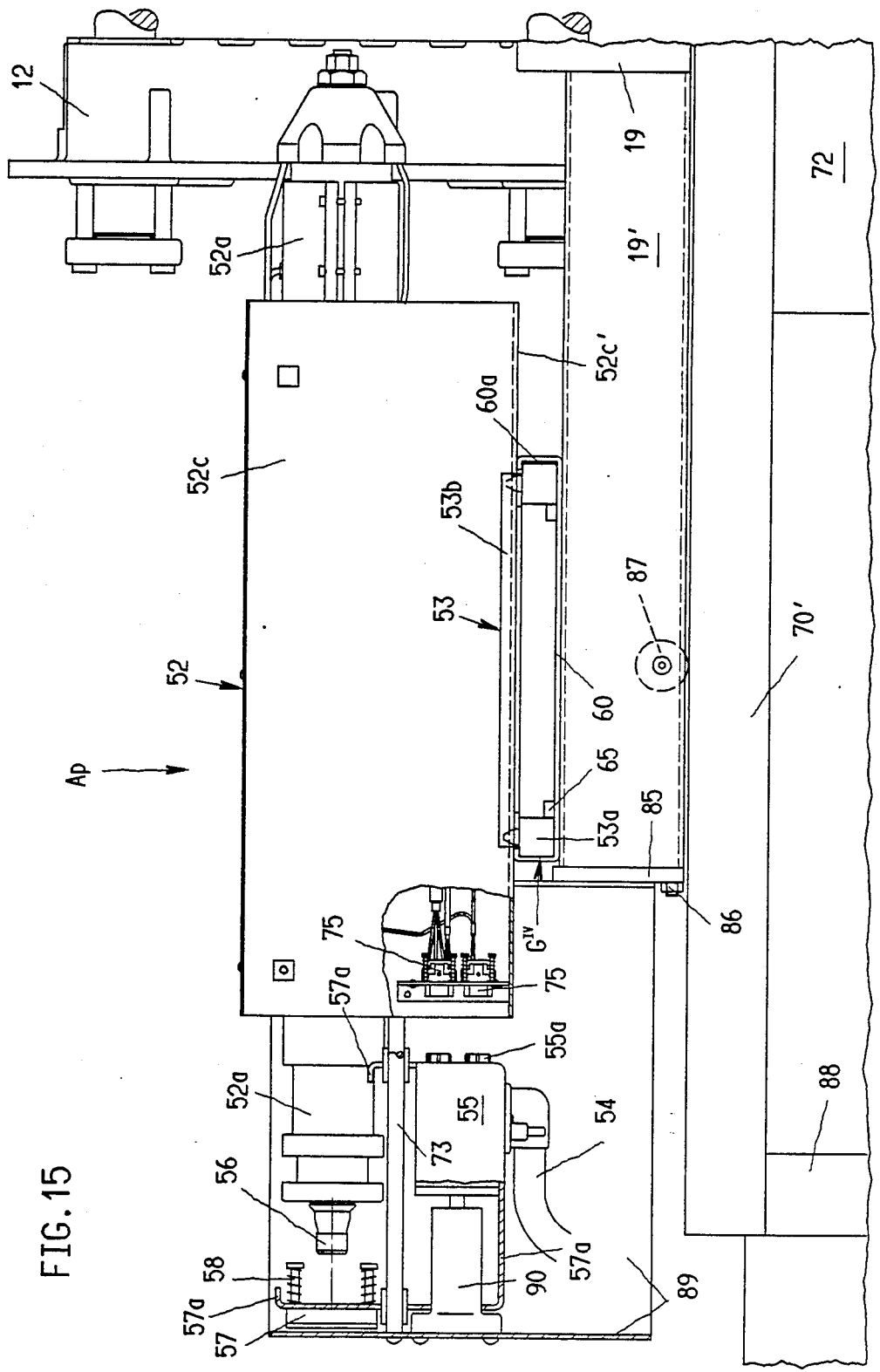

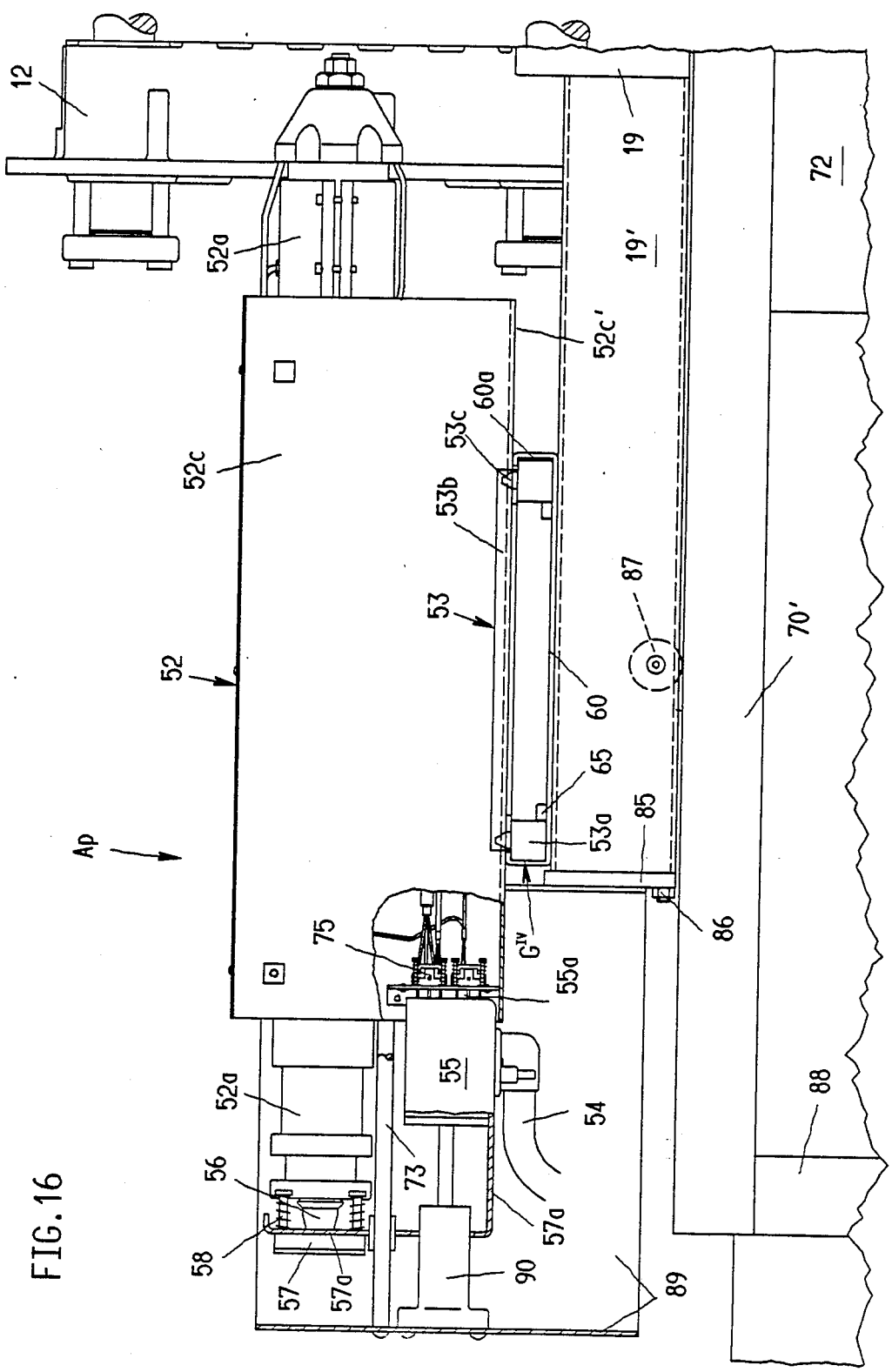

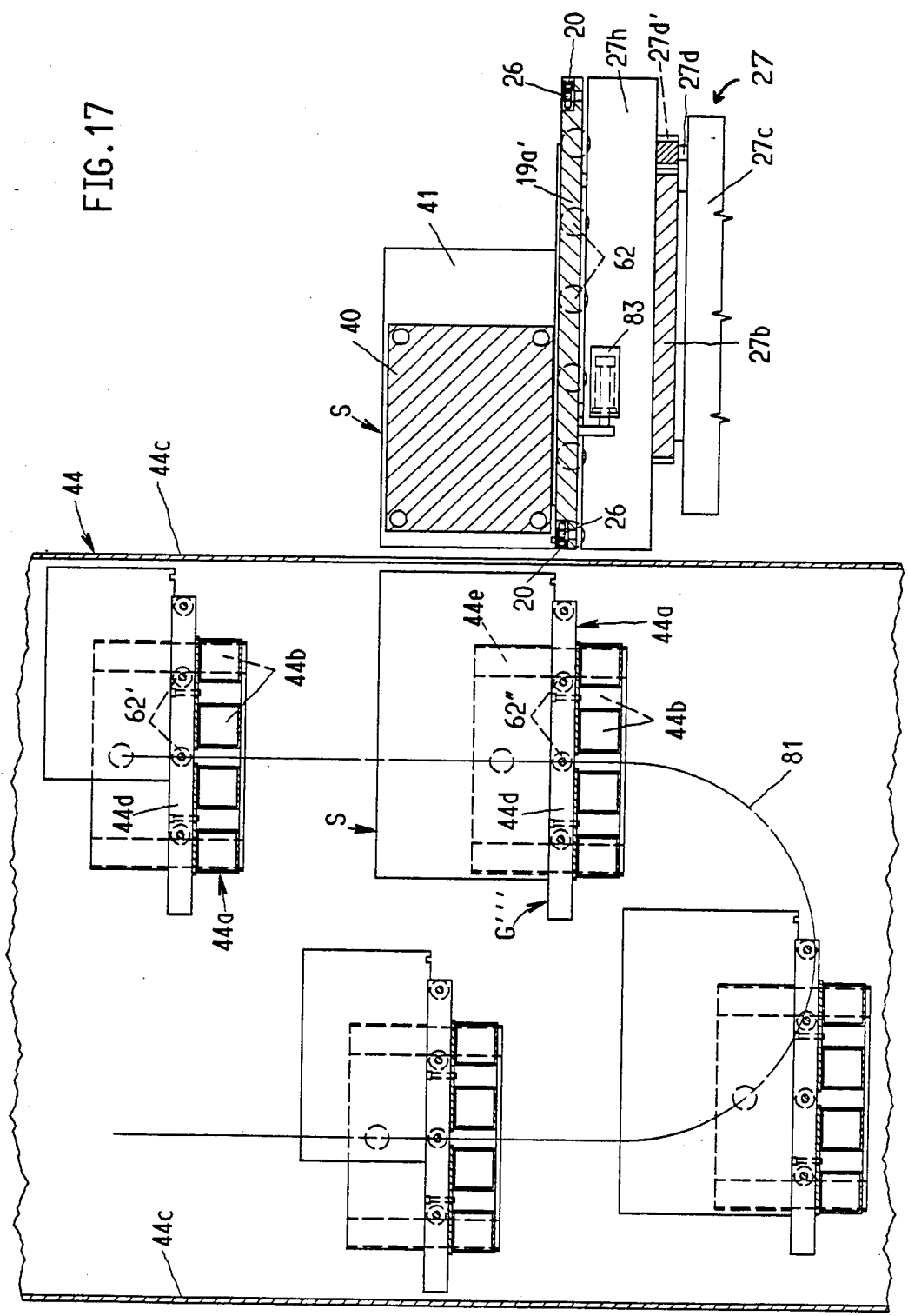

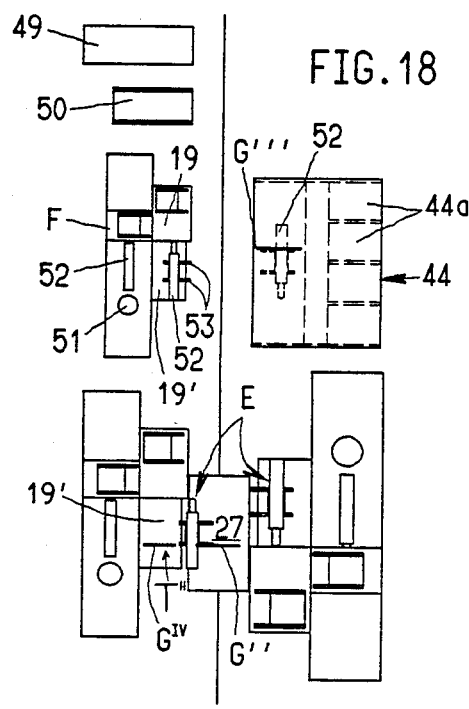
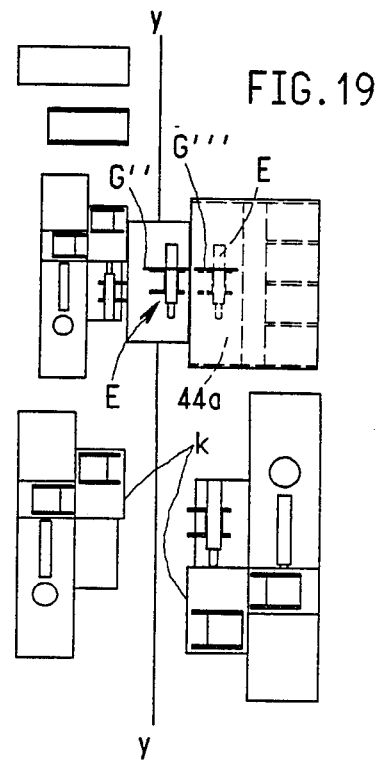
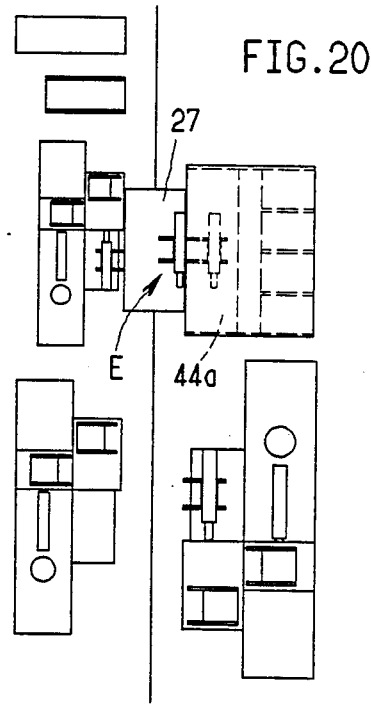
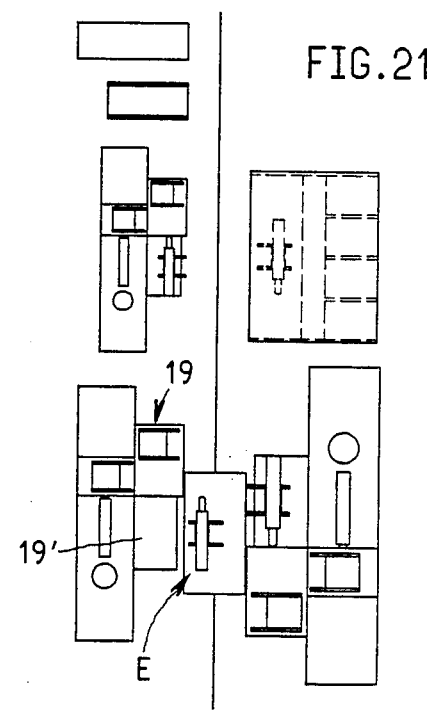

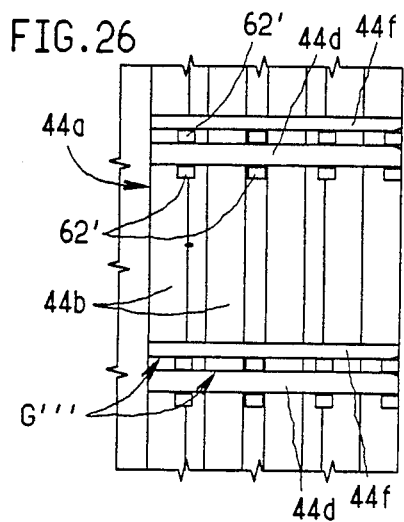
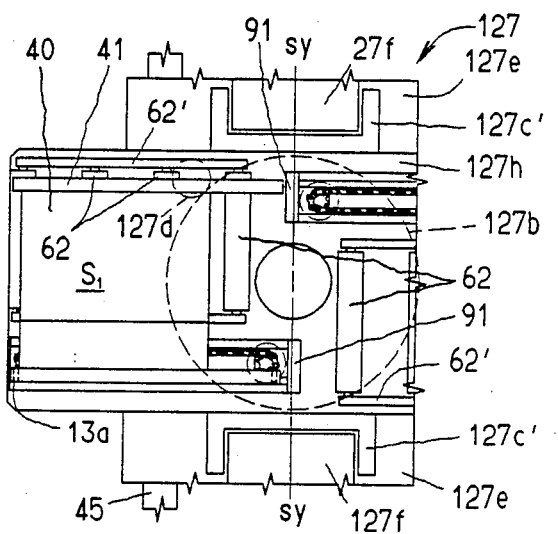
FIG.26
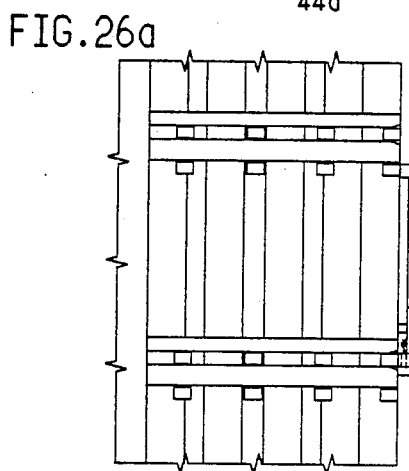
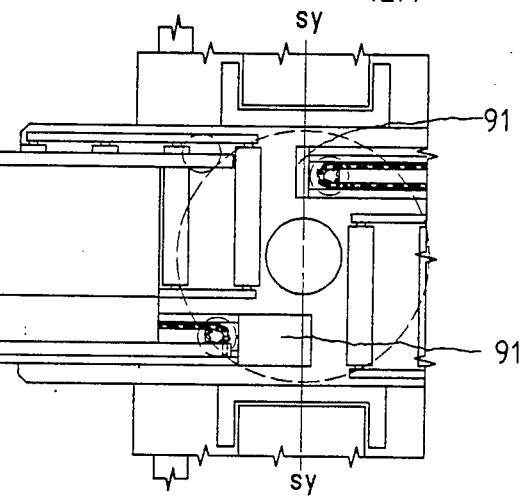
FIG.26a
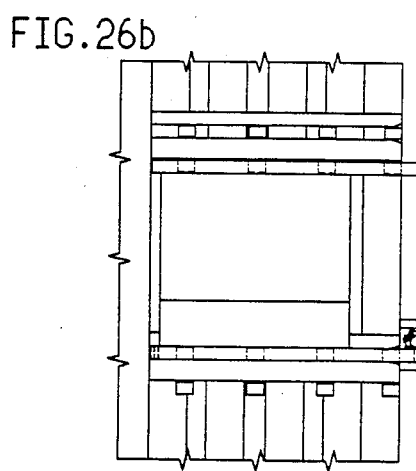
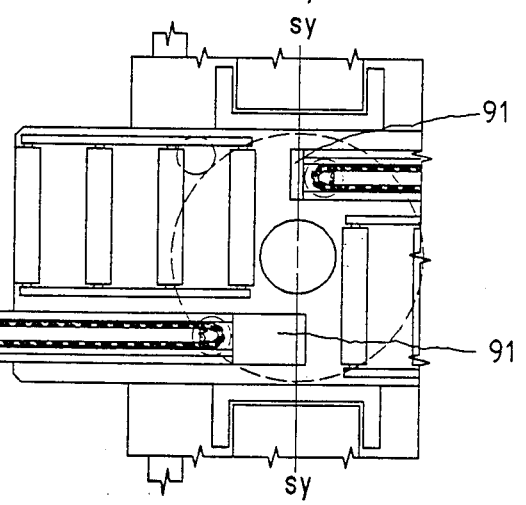
FIG.26b

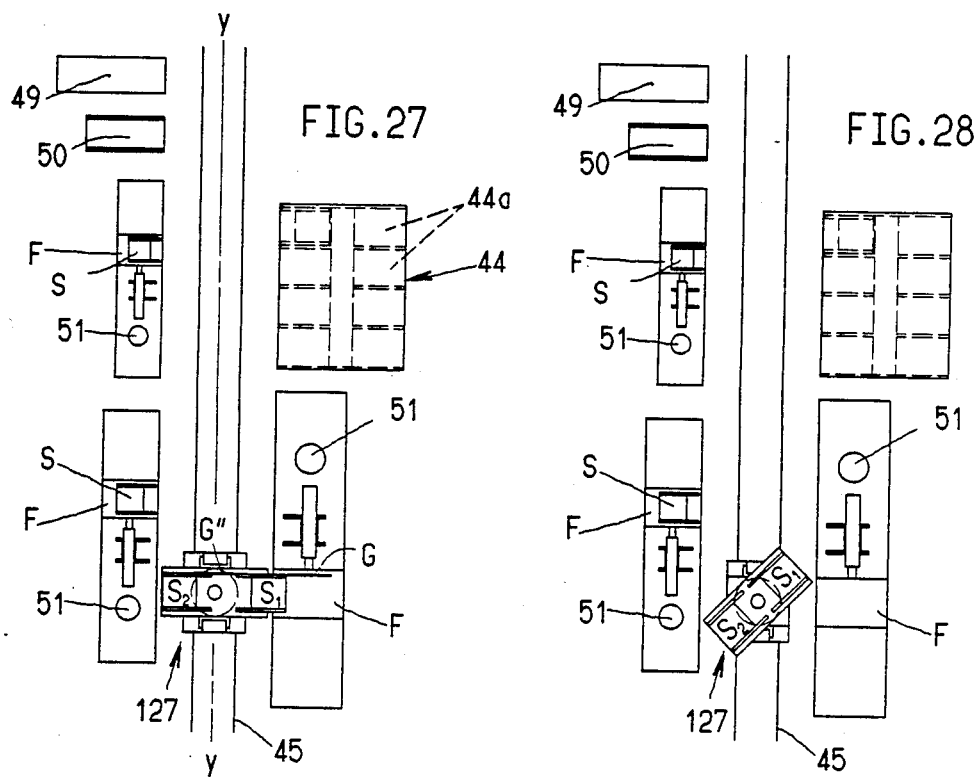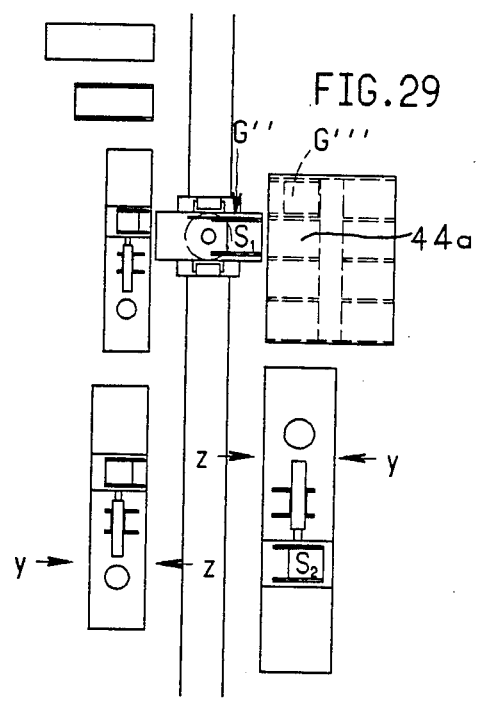

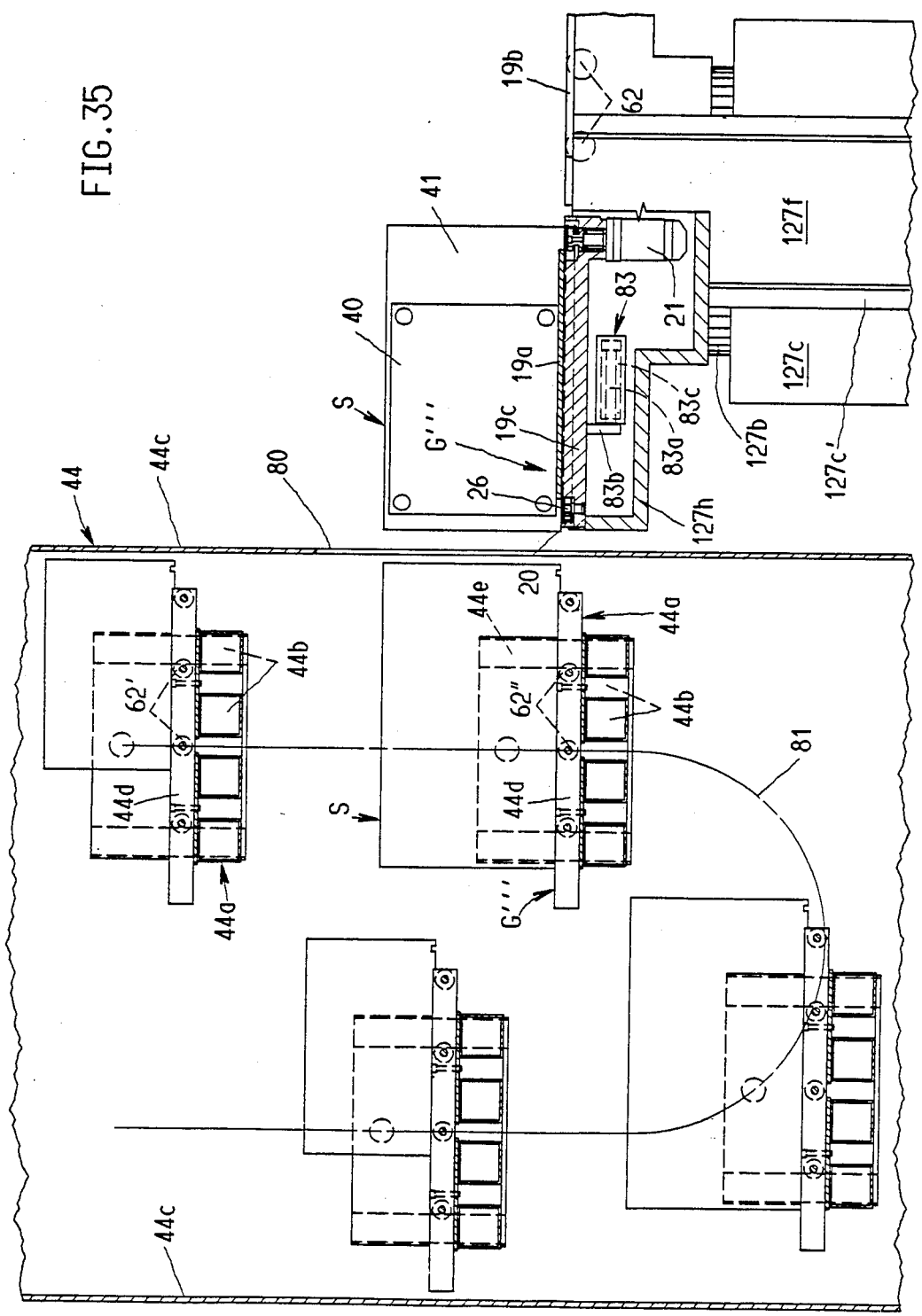

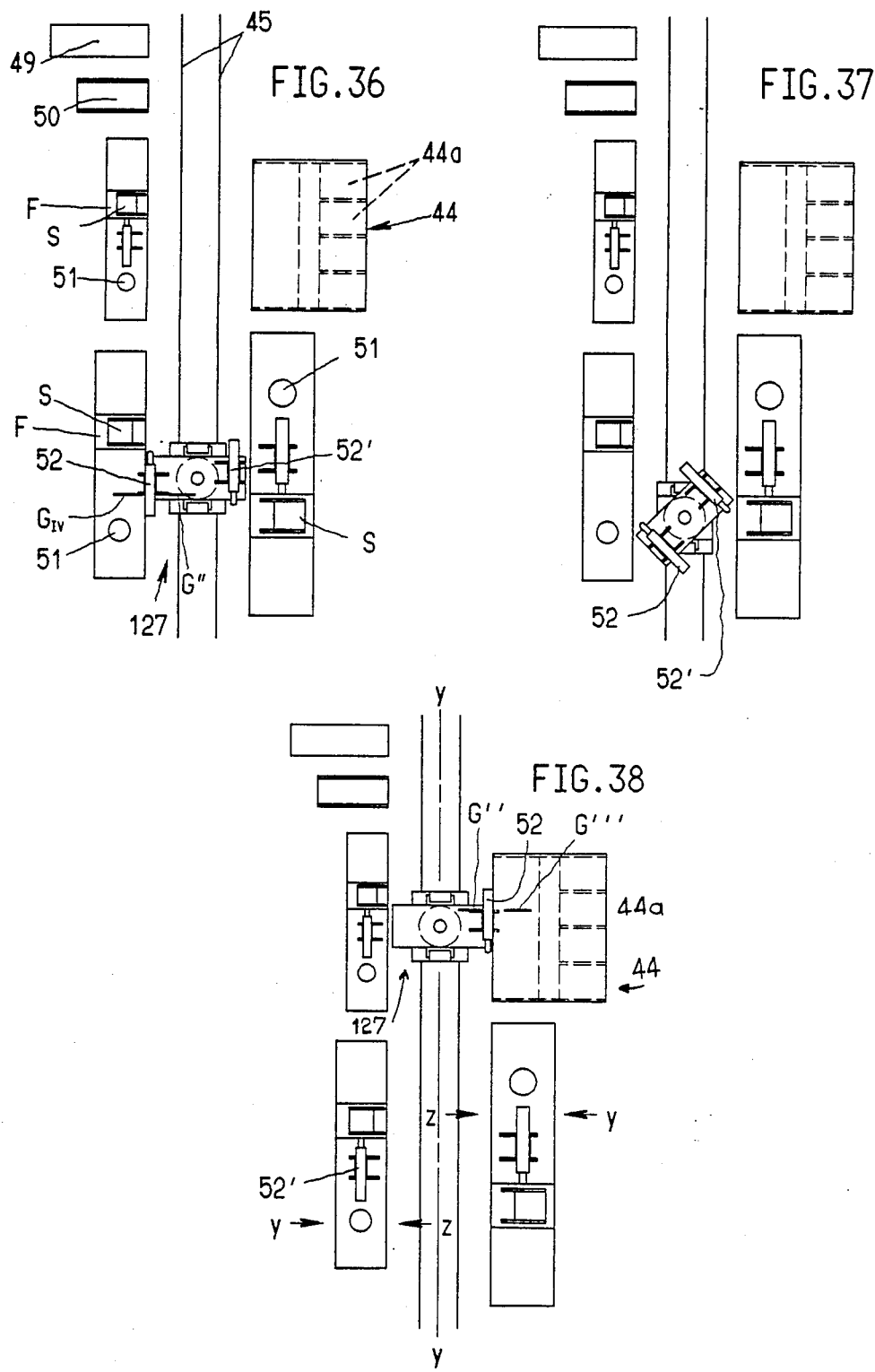

COMPONENT CHANGING APPARATUS SERVING A GROUP OF INJECTION MOLDING MACHINES

BACKGROUND OF THE INVENTION

This invention relates to a component changing apparatus serving a group of injection molding machines, each having a mold clamping space receiving a mold which has opposite clamping plates and which is adapted to be tightened in the mold clamping space. Further, each injection molding machine has a horizontally oriented injection molding unit which may be placed into a withdrawn, lowered support position and which has a plasticizing unit that can be coupled to and uncoupled from the other components of the injection molding unit. The component may be a mold or another unit of an injection molding machine, such as a plasticizing unit. Each injection molding machine further has a mold changing table adjoining the rear end of the associated injection molding machine. Each mold changing table has mold guides for guiding the molds to two mold placements defined on the mold changing table. The mold changing tables are shiftable parallel to the injection molding axis of the respective injection molding machines in such a manner that their mold guides form, alternatingly with a mold guide in the clamping space, a conveying path (transport track) which is oriented perpendicularly to the injection molding axis. The mold may be shifted on the transport track by means of a mold shifting device for displacement from the clamping space to the mold changing table and conversely. The mold changing apparatus further has a mold magazine having a number of storage compartments as well as a transport device for transporting the molds between the mold changing tables and the mold storage compartments.

In a mold changing apparatus of the above-outlined type, as disclosed, for example, in German Patent No. 3,242,269 to which correspond U.S. Pat. No. 4,462,783 and Canadian Patent No. 1,212,213, one of the two emplacements of the mold changing table serves alternately as a conditioning space for the preheating and other preparation of the mold to be inserted into the clamping space of the injection molding machine. During the mold changing operation the mold movements are programcontrolled and are thus fully automated in the zone of the mold clamping space and the mold changing table. For transferring the mold removed from its injection molding machine to the mold magazine (mold storage device), however, an integration of the control in the entire mold changing program is not readily feasible because the mold storage device need not be situated in a predetermined spatial relationship relative to the injection molding machine.

A similar mold changing apparatus is disclosed in published European application No. 92,686 wherein, as illustrated in FIG. 11, the mold is moved from the mold clamping space immediately to a rail-mounted carriage situated at the same level and moved thereon to the mold magazine.

In another known changing apparatus for replacing working units (molds or plasticizing units) at least at one injection molding unit, a frame stand straddles the injection molding machine as well as an adjacent magazine for such units. On the frame stand there is arranged a bridge crane which is movable transversely to the injection molding axis and which has a trolley movable parallel to the injection molding axis. The trolley has a vertically movable carrier arm with a gripper device. During transport of the units from the injection molding machine to the magazine, the units are suspended from a carrier arm of the trolley and thus necessarily travel over areas occupied by operating personnel. Such an apparatus is disclosed in European Patent No. 69,221.

As disclosed in German Offenlegungsschrift (non-examined published application) No. 1,629,746, it is further known to transport molds by means of a rotary table from an automatic injection molding machine into storage compartments of an adjacent magazine. The rotary table may be vertically moved in a carrier column to the level of the superimposed storage compartments.

SUMMARY OF THE INVENTION

It is an object of the invention to provide an improved component changing apparatus of the above-outlined type which, in a fully automatic operation and relatively low manufacturing expense avoids an overhead travel above the space occupied by operating personnel of the injection molding machines and thus eliminates a suspended transport of components, representing a poor safety risk, while nevertheless making possible a space-saving arrangement adapted to a variable number of injection molding machines of identical or different size.

This object and others to become apparent as the specification progresses, are accomplished by the invention, according to which, briefly stated, a transport carriage is arranged for travel on a carriage track oriented parallel to the injection axis of each said injection molding machine, between a storage magazine and a selected injection molding machine. A platform is mounted on the transport carriage for rotation through at least 180° about a vertical axis. The platform defines an emplacement for holding a mold to be carried by the transport carriage. A mold guide is mounted on the platform for guiding the mold for a horizontal displacement into and out of the emplacement of the platform. Transport tracks ar formed by the mold guides on the carriage and on the respective mold changing table and by the mold guides on the carriage and in a selected storage compartment when the transport carriage is in a coupling position adjacent one of the mold changing tables or the storage magazine, respectively. There is further provided a mold shifting device mounted on the transport carriage for moving a mold between one of the storage compartments and the emplacement of the transport carriage or between the emplacement of the transport carriage and an emplacement of one of the mold changing tables, dependent on a coupling position of the transport carriage.

The transporting path of the transport carriage extends from the injection molding machines to the magazine and conversely along the rear sides of the injection molding machines not occupied by personnel. Such path extends only at approximately breast height whereby the mold changing apparatus can operate with a very low safety risk. By virtue of the mirror-symmetrical arrangement of the injection molding machines relative to the one and the other side of the guide track for the mold transport, all the injection molding machines of the group may be served by the same transport carriage. There is thus obtained a mold transport track which is "walled in" by the bilaterally arranged injection molding machines and which is thus isolated to a great measure from the operating personnel.

Particularly favorable conditions for a rational mold changing operation and an economical serial manufacture as well as space-saving arrangement may be obtained by providing that the storage compartments of the magazine move in a vertical, endless path and the magazine as well as the transport carriage may be utilized for molds as well as for transport units including, for example, plasticizing cylinders.

BRIEF DESCRIPTION OF THE DRAWING

FIGS. 5, 5a and 5b are schematic top plan views of one part of the preferred embodiment shown in different operational positions in the zone of a transport track leading to a mold storage space.

FIGS. 7, 8, 9 and 10 are schematic top plan views of sequential positions of the mold changing apparatus for illustrating the principle of the mold changing operation.

FIGS. 15 and 16 are partially broken-away side elevational views of a plasticizing unit positioned on a conditioning emplacement on the mold changing table, depicted prior and subsequent to attachment of supply conduits.

FIG. 17 is a schematic sectional side elevational view of an endless vertical conveying system for the mold storage compartments in the zone of the input and discharge opening of a magazine.

FIGS. 18, 19, 20 and 21 are schematic top plan views of the preferred embodiment showing different sequential positions to illustrate the principle of a changing operation involving the replacement of plasticizing units.

FIGS. 26, 26a and 26b are top plan views in different positions of the transporting changing table situated at a component storing compartment.

FIGS. 27, 28 and 29 are schematic top plan views illustrating sequential positions of the mold changing apparatus according to the second embodiment.

FIG. 35 is a schematic sectional side elevational view of an endless vertical conveying system for the component storing compartments in the zone of the input and discharge opening of the magazine FIGS. 36, 37 and 38 are schematic top plan views of the second preferred embodiment showing different sequential positions to illustrate the principle of a changing operation involving the replacement of plasticizing units.

DESCRIPTION OF THE PREFERRED EMBODIMENTS

It is the purpose of the changing apparatus according to the invention to perform a computer-controlled replacement of components (such as molds or plasticizing units) for a plurality of spatially grouped injection molding machines. The computer-controlled replacement pertains to all transporting motions including those performed to and from the mold storage magazine.

Figure 1:
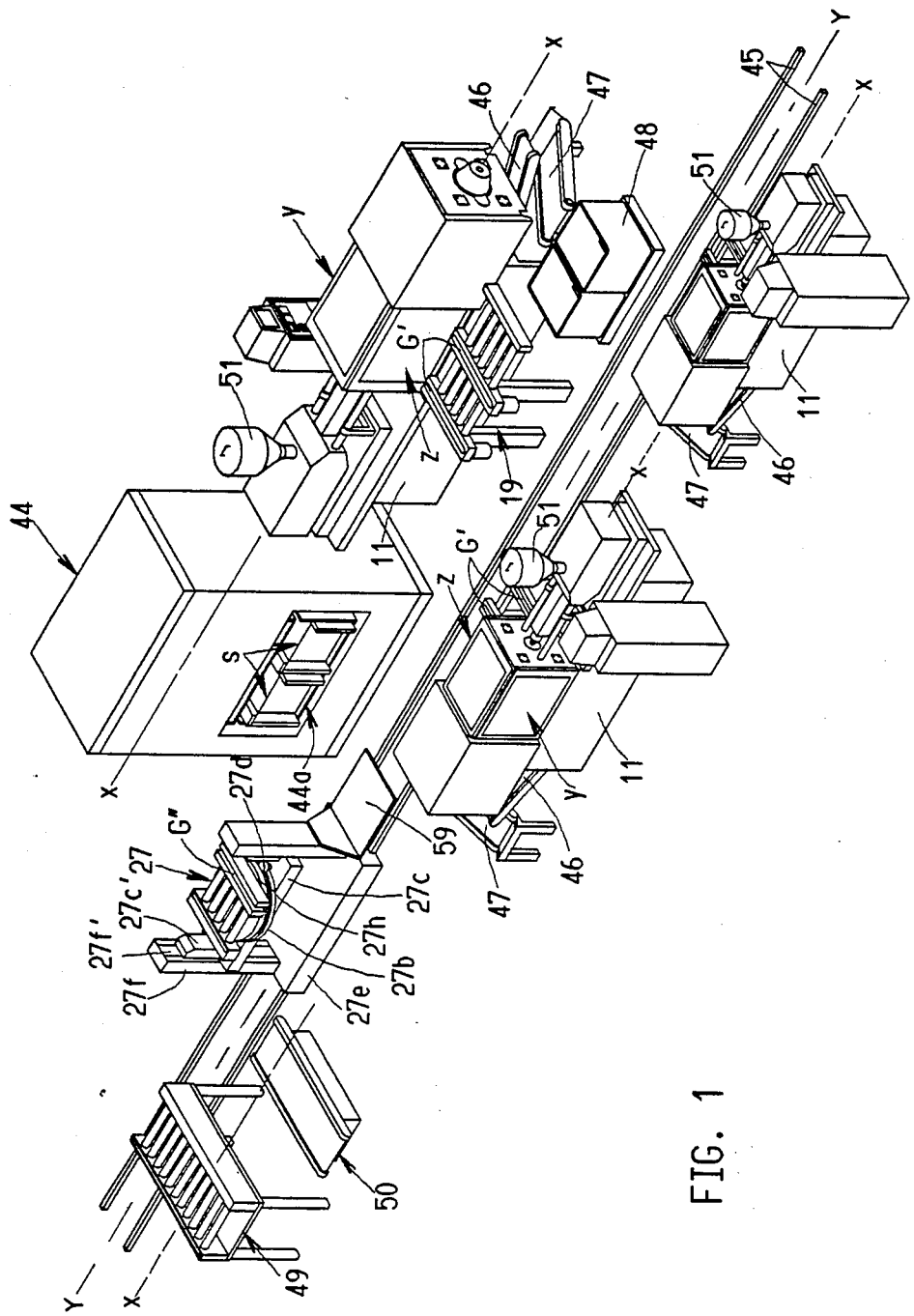
FIG. 1 is a schematic perspective illustration of a preferred embodiment of the mold changing apparatus according to the invention, shown with a group of injection molding machines.

A preferred embodiment of the invention schematically illustrated in the perspective FIG. 1 shows, in conjunction with FIGS. 7–10, the mold changing apparatus without devices for changing the plasticizing units. FIGS. 2–6 and 11–21 show transporting and storing devices for performing mold replacement. These devices are also adapted for performing a replacement of the plasticizing units.

Since the replacement operation of the plasticizing units does not involve any alterations on the apparatus serving for the mold replacement but only needs additional components, in the description which follows there will be set forth the mold replacing apparatus with additional components for replacement of the plasticizing units as a structural and functional unit.

Figure 2:
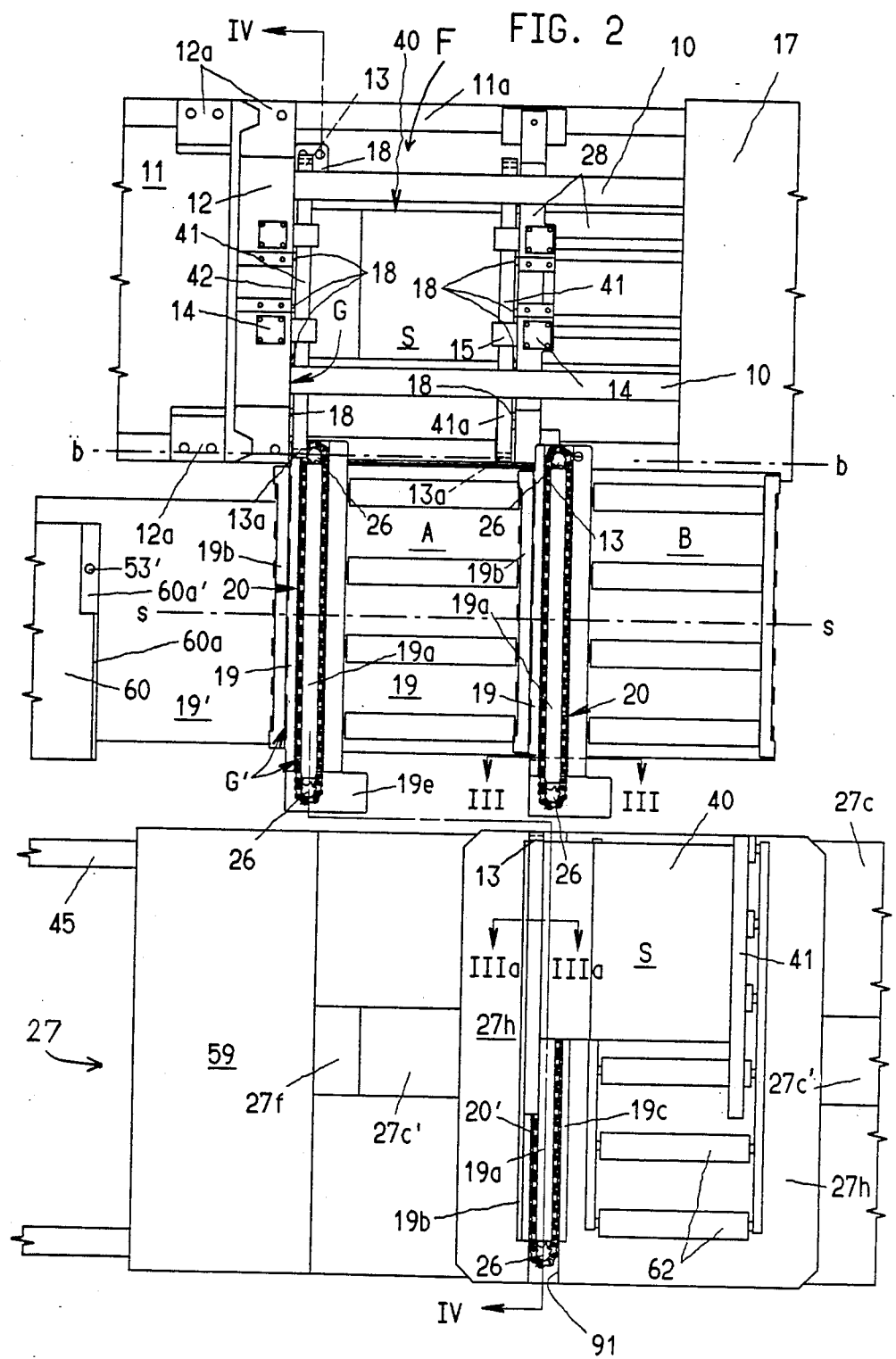
FIG. 2 is a top plan view of one part of the preferred embodiment in the zone of the transport track between the mold clamping space of an injection molding machine and a transport carriage.
Figure 4:
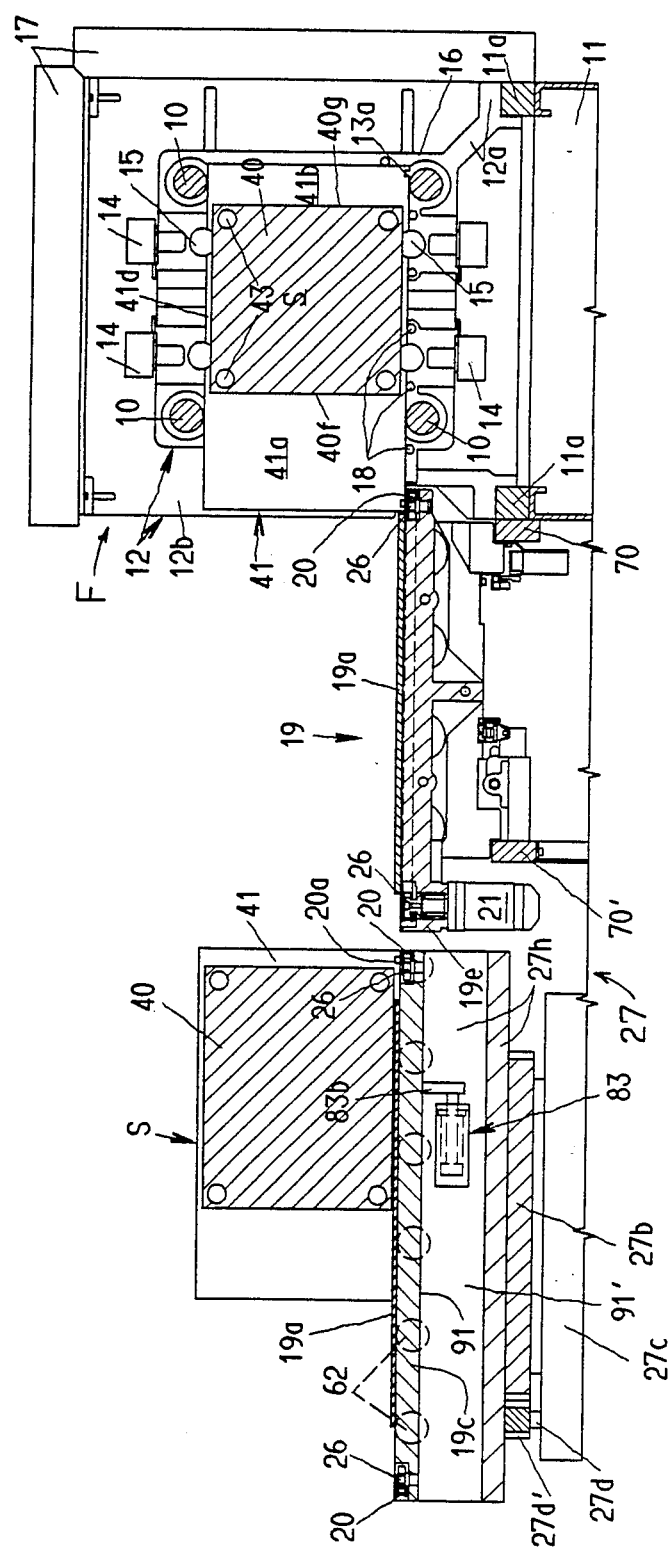
FIG. 4 is a sectional view taken along line IV—IV of FIG. 2.
Figure 11:
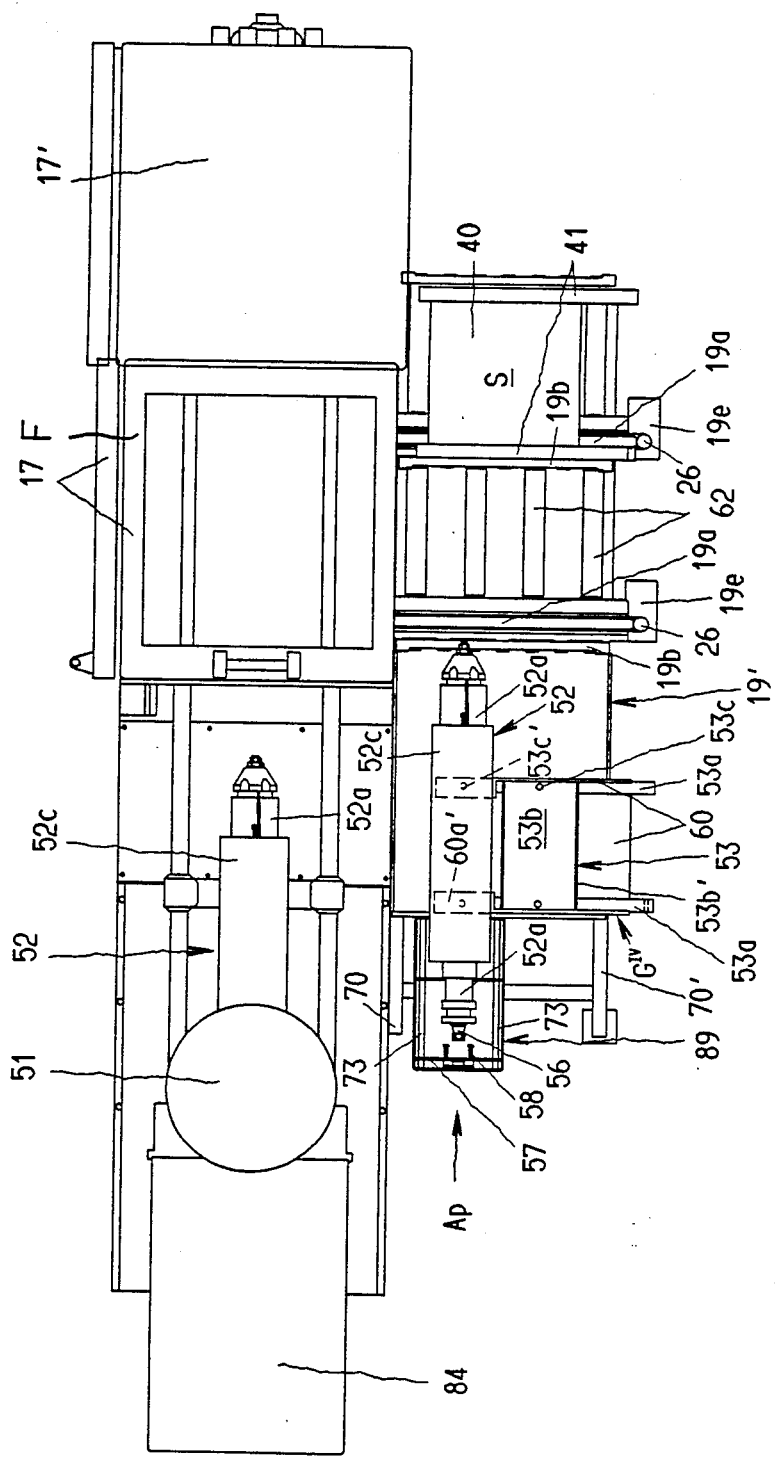
FIG. 11 is a top plan view of an injection molding machine served by the mold changing apparatus according to the invention, also showing a plasticizing unit on a conditioning emplacement of a mold changing table.
Figure 14:
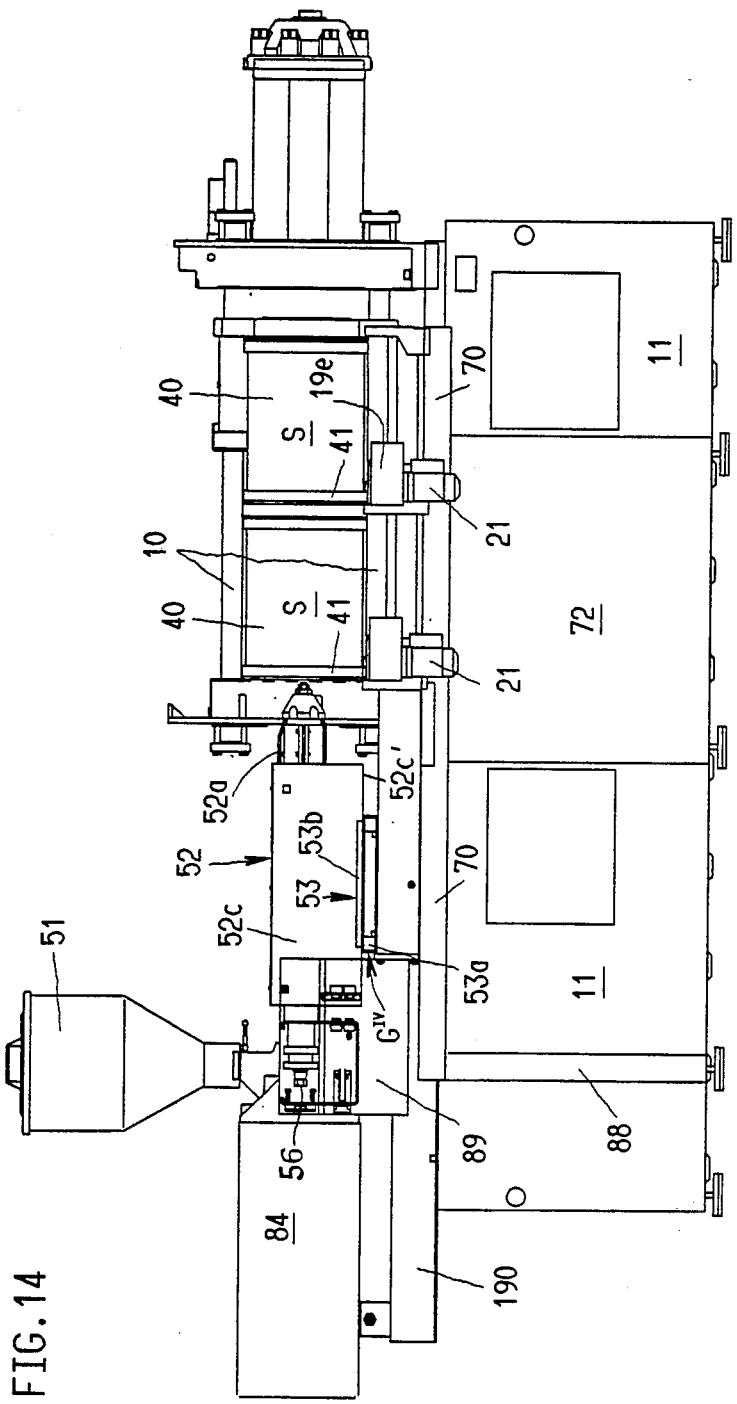
FIG. 14 is a side elevational view of the injection molding machine of FIGS. 11 and 13.

The injection molding machines combined into a group are of conventional construction:

On a generally rectangular machine bed 11 there are mounted a mold closing unit and a horizontal injection molding unit. As illustrated in FIG. 14, the injection molding unit may be moved by means of a hydraulic drive assembly 84 supported on a pedestal 190 of the machine bed 11 away from a mold S into a lowered position in which the nozzle of the plasticizing unit 52 is thermally separated from the mold S. The plasticizing unit 52 which includes a plasticizing cylinder 52a and a conveyor screw 56 may be uncoupled from the injection molding unit in a program-controlled manner. With reference to FIGS. 2 and 4, the movable mold carrier 28 of the mold closing unit is guided on horizontal beams 10 and is supported on guide rails 11a of the machine bed 11. The guide rails 11a also support the stationary mold carrier 12 (having a reinforcing shield 12b) with the intermediary of support components 12a. The drive assembly for the movable mold carrier 28 is shielded by stationary protective covers 17', while the clamping space F is shielded by movable protecting covers 17 as shown in FIGS. 4 and 11.

Each injection molding machine of the group has a feed hopper 51 and is arranged on either side of a linear guide 45 formed of two rails such that the rear part z of each injection molding machine is oriented towards the guide 45 while the access side y is oriented away therefrom. The injection axes x—x of the injection molding machines are situated parallel to one another or may be in a coaxial relationship if the injection molding machines are identical. Each injection molding machine of the group is on its rear side equipped with a mold changing table 19 of known construction, disclosed, for example, in German Patent No. 3,242,169. The mold changing table 19 has mold guides G' for the two mold placements A, B, as shown in FIG. 2. The mold changing tables 19 ar displaceable in such a manner parallel to the injection axes x—x approximately to the extent of a mold width that the mold guides G' alternately form with a mold guide G in the clamping space F of the adjacent injection molding machine, a transport track G', G oriented transversely to the injection axis x—x. On the transport track G', G there is shiftable a mold S by means of a mold shifting device from the mold clamping space F onto the mold changing table 19 and conversely.

With reference to FIGS. 1, 5, 5a, 5b, the mold changing apparatus further comprises a magazine 44 which has a plurality of storage compartments 44a. The mold changing apparatus further has a transport carriage 27 for conveying the molds S or transport units E between the mold changing tables 19 or, in case of transport units E, the changing table extensions 19' and the magazine storage compartments 44a. Each storage compartment 44a has a mold guide G''' oriented transversely to the parallel injection axes x—x. Each carriage 27 is provided with a mold guide G'' and a mold shifting device (conveyor chain 20) and is alternately movable to a coupling position in which the height adjustable mold guide G'' forms a transport track with a mold guide G''' of a storage compartment 44a or with a mold guide G$^{IV}$ of an extension 19' of a mold changing table 19. The transport track formed by the mold guide G'' of the carriage 27 and the mold guide G$^{IV}$ of the extension 19' serves for the transfer of plasticizing units from the extension 19' of the mold changing table 19 to the transport carriage 27 and conversely. The injection molding machines of the group are, with respect to the longitudinal edges k (FIGS. 9, 19) of the respective mold changing table 19 at the same distance from the vertical symmetry plane y—y of the guide 45.

In the description which follows the functional units of the component changing apparatus will be described in detail.

Figure 3:
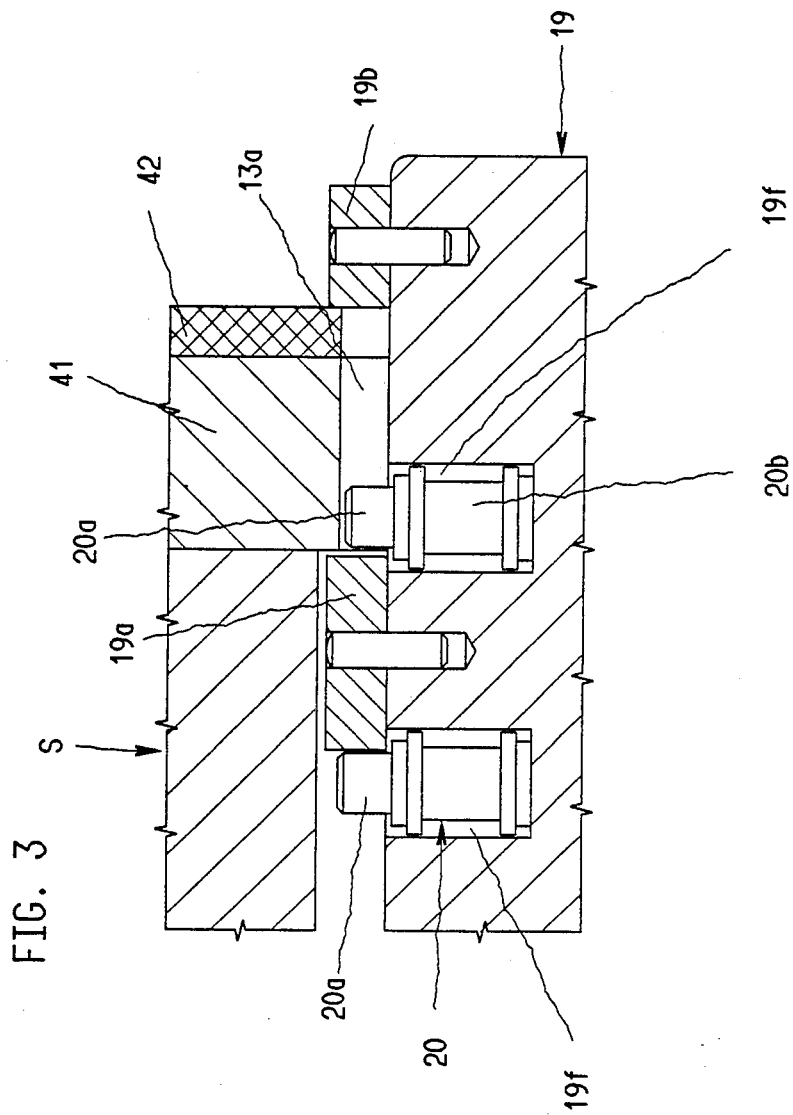
FIG. 3 is an enlarged sectional view taken along line III—III of FIG. 2, also showing part of an associated mold.
Figure 3A:
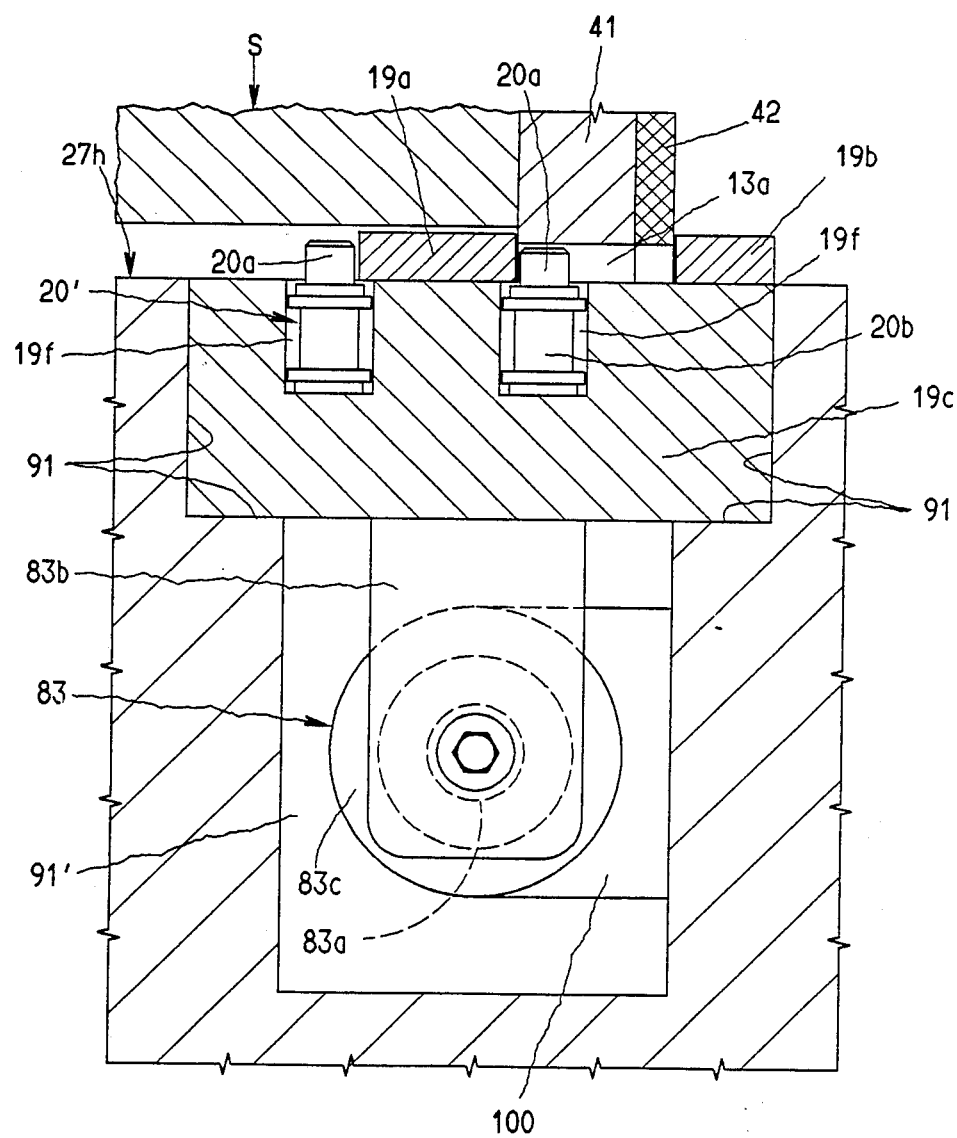
FIG. 3a is a sectional view taken along line IIIa—IIIa of FIG. 2, also showing part of an associated mold.

Turning to FIGS. 2 and 3, with the mold emplacements A and B of each mold changing table 19 there are associated two identical endless transport chains 20 which project beyond the longitudinal ends of the mold changing table and which extend transversely and generally symmetrically on either side of the vertical symmetry plane s—s of the respective mold changing table 19. The axes of the end sprockets 26 of the conveyor chains 20 are oriented vertically and are, together with the flights of the conveyor chains 20, sunken in grooves 19f in such a manner that the carriers 20a formed as an axial continuation of a respective chain pin 20b project beyond the upper surface of the mold changing table 19. The conveyor chains 20 each bound the mold emplacements A and B on the same (left) side, as illustrated in FIG. 2. The end sprockets 26 are situated externally of the base surface of the mold changing table 19. At that end of each conveyor chain 20 of the mold changing table 19 which is oriented away from the mold clamping space F there is arranged, in a receiving part 19e, a drive motor 21 which is coaxial with the sprocket 26 for the respective conveyor chain 20, as illustrated in FIGS. 1, 2 and 4. The timed run of the conveyor chains 20 is controllable by control elements which are secured to the conveyor chains 20 and cooperate by means of control tabs with stop switches of the mold changing table 19. The pulling or, respectively, pushing flight of each conveyor chain 20 runs between the guide strips 19a and 19b constituting the guide G' and along the lower edge of the clamping plate 41 of the mold S to be transported.

Figure 6:
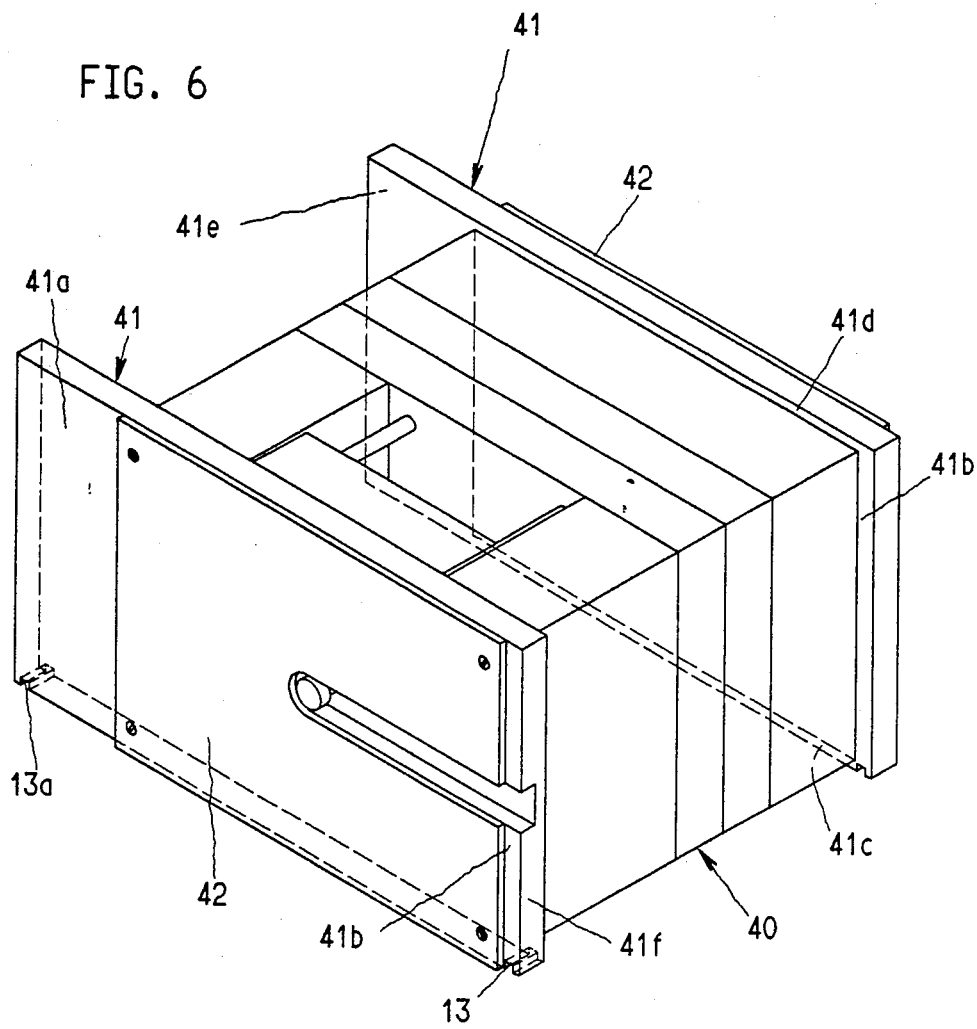
FIG. 6 is a perspective view of a mold adapted to be handled by the mold changing apparatus according to the invention.

With particular reference to FIG. 6, the molds S which may be of different dimensions, each comprise a rectangular mold body 40 composed of standardized plates and two end plates or clamping plates 41 bounding the mold body 40 on opposite sides. The clamping plates 41 are, with the aid of centering pins, secured to the mold body 40 and thus constitute an integral part of the mold S. On the outside (clamping surface) of each clamping plate 41 there is mounted an insulating plate 42. The clamping plates 41 project beyond the outline of the mold body 40 on each side. The guide zone 41c that projects downwardly beyond the mold body 40 serves for guiding the mold S at least in the mold guides G', G'' from the mold changing table 19 to the transport carriage 27. Both clamping plates 41 are, in the guide zone 41c, provided with two standardized transverse grooves 13, 13a (coupling organs) oriented parallel to the closing direction of the form closing unit and are of rectangular cross section. The vertical axes of the sprockets 26 oriented towards the clamping space F and the rear transverse grooves 13a of the mold S situated in the clamping space F lie in a common plane b—b oriented parallel to the mold closing direction, as seen in FIG. 2. That zone 41a of the clamping plates 41 that project substantially rearwardly beyond the mold body 40 brings the transverse groove 13a provided in the vertical terminal edge 41e of a clamping plate 41 of a mold S situated in the clamping space F in such a manner into the zone of the carrier 20a of the conveyor chain 20 of the mold changing table 19 that the carrier 20a, upon movement of the conveyor chain 20 as a result of its circular motion with the associated sprocket 26, may move into or out of the transverse groove 13a. The guide zones 41c simultaneously serve, in cooperation with the upper clamping zone 41d projecting upwardly of the mold body 40, for the clamping of the mold halves on the form carriers 12, 28 by means of clamping bolts 15 which are controlled by hydraulic cylinders 14. The clamping bolts 15 engage beyond the clamping plates 41 in the guide zone 41c and in the clamping zone 41d by means of clamping lugs as it may be seen in particular in FIGS. 2 and 4. The frontal transverse grooves 13 too, are situated in the immediate vicinity of the vertical terminal edges 41f of the associated clamping plates 41.

In the description which follows, the construction of the transport carriage 27 will be set forth with particular reference to FIGS. 1, 2, 4 and 17.

In a platform 27e of the transport carriage 27 there are anchored two vertical columns 27f symmetrically to the vertical symmetry plane y—y. In guides 27f' of the columns 27f there is vertically guided a sled which may be arrested in a desired height position. The sled comprises a horizontal support plate 27c and vertical guide legs 27c' which are slidably supported in the guides 27f'. On the support plate 27c there is supported a rotary disc 27b for a rotation about 180°. A drive motor is sunken in the support plate 27c and has a vertically oriented drive shaft 27d. A pinion 27d' of the drive shaft 27d meshes with a ring gear mounted on the periphery of the rotary disc 27b. On one of the columns 27f, symmetrically to the vertical symmetry plane y—y, there is further arranged a support face 59 for moving away collecting bins 48 containing the articles produced during the injection molding operation. The articles are conveyed on the conveyor belts 46, 47 oriented perpendicularly to the injection axes x—x. A carrier plate 27h receives the linear mold guide G'' as well as the conveyor chain 20' constituting a mold shifting device.

As shown particularly in FIGS. 3a, 4, 5, 5a and 5b, the conveyor chain 20' is, together with the drive motor 21 and end sprockets 26, received by a shift bar 19c which is supported in a guide support 91 of the carrier plate 27h for limited displacement in the conveying direction of the conveyor chain 20'. The carrier plate 27h is fixedly secured to the rotary disc 27b of the transport carriage 27 as shown in FIGS. 1, 2, 4, 5 and 17. The guide strips 19a, 19b which are secured on the upper face of the shift bar 19c constitute a sliding guide for the clamping plate 41 of the mold S. In a hollow space 91' of the carrier plate 27h (FIG. 3a) there is arranged a hydraulic power cylinder unit 83 whose cylinder 83c is connected with the carrier plate 27h by means of a securing piece 100 and whose piston rod 83a applies a force on the shift bar 19c with the intermediary of a connecting piece 83b to effect a shifting motion of the component 19c.

By virtue of the above-described construction, the transport carriage 27 may travel without impediment past the adjoining mold changing tables 19 into its desired coupling position to establish the transport tracks G'', G'; G'', G'''; and G'', G$^{IV}$ and then, after reaching such a coupling position, it may establish the required "standby-for-coupling" state of the coupling organs of the chain shifting device of the transport carriage 27. Prior to the shift into the standby position, that is, in a position of rest of the conveyor chain 20 of the mold shifting device, the transport carriage 27 may travel along and past the mold changing tables 19 without colliding with the conveyor chains 20 which are mounted on the mold changing tables 19 and which project beyond the base face of the respective mold changing table 19 in the zone of those sprockets 26 which are oriented toward the transport carriage 27. After completing the motion into the standby position, the carrier 20a of the conveyor chain 20 which is now situated in the standby position for coupling, may be laterally introduced into the adjacent transverse groove 13a of a mold S or a transport unit E situated on the mold exchanging table 19 or in the magazine, for pulling such component onto the transport carriage 27.

For shifting a mold S situated on the transport carriage 27 and thus coupled to the conveyor chain 20 of the mold shifting device, onto the adjoining mold shifting table 19, the mold shifting device is placed in a "standby-for-coupling" position by virtue of shifting it into such standby state. In the "standby-for-coupling" position the carrier 20a of the adjoining conveyor chain 20 of the mold changing table 19 can be guided into the transverse groove 13 of the mold S.

A shift into the standby state is a precondition for ensuring that a mold S deposited on the transport carriage 27 or a transport unit E attains on the transport track T' a proper orientation in the storage compartment 44a. By virtue of the shift into the standby state, the starting point for the named units on the transport carriage 27 may be advanced. The same applies for the transfer of a transport unit E from the transport carriage 27 on the extended portion 19e of the mold changing table 19 during the replacement of a plasticizing unit.

With particular reference to FIGS. 5, 5a, 5b and 17, the magazine 44 for the mold S and the transport units E which contain the plasticizing units 52 includes a casing formed of walls 44c and having, at the height level of the mold guides G'' of the transport carriage 27, an opening for the introduction or removal of components to be stored or retrieved from storage. In the casing the storage compartments 44a are moved in an endless path in a vertical plane as may be best observed in FIG. 17. In this manner, the storage compartments 44a may be placed into a height level for insertion or removal, corresponding approximately to the average height of all the mold changing tables 19 of the group.

The storage compartments 44a are formed essentially by support rollers 62', 62'' which are rotatably supported in lateral support strips 44d oriented in the transporting direction. The support strips 44d are components of a skeleton construction which forms a gondola movable along a motion path 81 as shown in FIG. 17. The skeleton construction of each gondola comprises horizontal carrier beams 44b extending along the entire width of the magazine 44 as well as vertical skeleton elements 44e. As it may be observed in FIG. 5b in conjunction with FIG. 17, the mold S or, as the case may be, the transport unit E is, during insertion into or removal from the respective storage compartment 44a guided on guide strips 44f which form, in conjunction with the support strips 44d, the mold guide G''' of the storage compartment 44a. The horizontal guidance of the gondolas on the track 81 of the endless vertical conveyor need not be described in more detail because such vertical endless conveying systems are well known by themselves and are described, for example, in German Auslegeschriften (examined patent applications) No. 1,654,737, 2,736,315 and 2,410,484.

In the description which follows, the extensions 19' of the mold changing tables 19 will be discussed in further detail, with particular reference to FIGS. 11–16. The extensions 19' which make possible a computer-controlled replacement of the plasticizing units 52, may be integral with the mold changing table 19 or may be provided as separate components.

Each extension 19' is formed of a profiled sheet metal member which is connected with the mold changing table 19 by means of a tensioning anchor 86 which, in turn, is supported on a tensioning terminal plate 85 as illustrated in FIG. 15. The mold changing table 19 extended in this manner is, together with its extension 19', propelled on runner rollers 87 on rails 70, 70' by means of a motor drive. The rail 70 is secured to the adjacent guide rail 11a of the machine bed 11, while the other rail 70' is supported on a support leg 88 as well as on a wall 72 formed by a profiled sheet metal member. The mold guide $G^{IV}$ of the extension 19', extending transversely to the injection axes x—x is formed, as particularly well seen in FIGS. 11, 12, 15 and 16, by a U-shaped profiled sheet metal member 60 having bilateral, twice-crimped edges 60a. The profiled sheet metal member is connected with the extension 19' by means of securing elements 65. A pallet 53 guidable in the mold guide $G^{IV}$ is composed of two engagement plate fragments 53a corresponding in function, orientation and dimension to the lower guide zone 41c of the clamping plates 41 of a mold S and a support plate 53b which connects the engagement plate fragments 53a with one another. The engagement plate fragments 53a are, similarly to the clamping plates 41 of the mold S, provided with transverse grooves 13, 13a. Upon displacement of the pallet 53, the engagement plate fragments 53a slide in the crimped edge 60a of the sheet metal component 60.

The plasticizing unit 52 surrounded by a rectangular tube 52c having a horizontal bottom supporting surface 52c' ma be lifted in a travel path (determined by guides of the injection molding machine) from its lowered, deposited position in the injection molding machine by means of guiding and organizing arrangements known by themselves and place it on the pallet 53 received on the mold guide $G^{IV}$ in a vertical direction for forming the transporting unit E with the pallet 53. Upon lowering the plasticizing unit 52 onto the pallet 53, the centering pins 53c of the support plate 53b penetrate into corresponding centering holes of the supporting surface 52c' to center the plasticizing unit 52 with respect to the pallet 53. The transport unit E formed in this manner by the pallet 53 and the plasticizing unit 52 may be transported by virtue of the support plate fragments 53a on the transport carriage 27 and placed in a storage compartment 44a precisely in the same manner as a mold S. This also applies to the displacement of the transport unit E on the transport track formed by the mold guide G" of the transport carriage 27 and the mold guide $G^{IV}$ of thelextension 19' with the aid of the chain 20' of the transport carriage 27.

Figure 12:
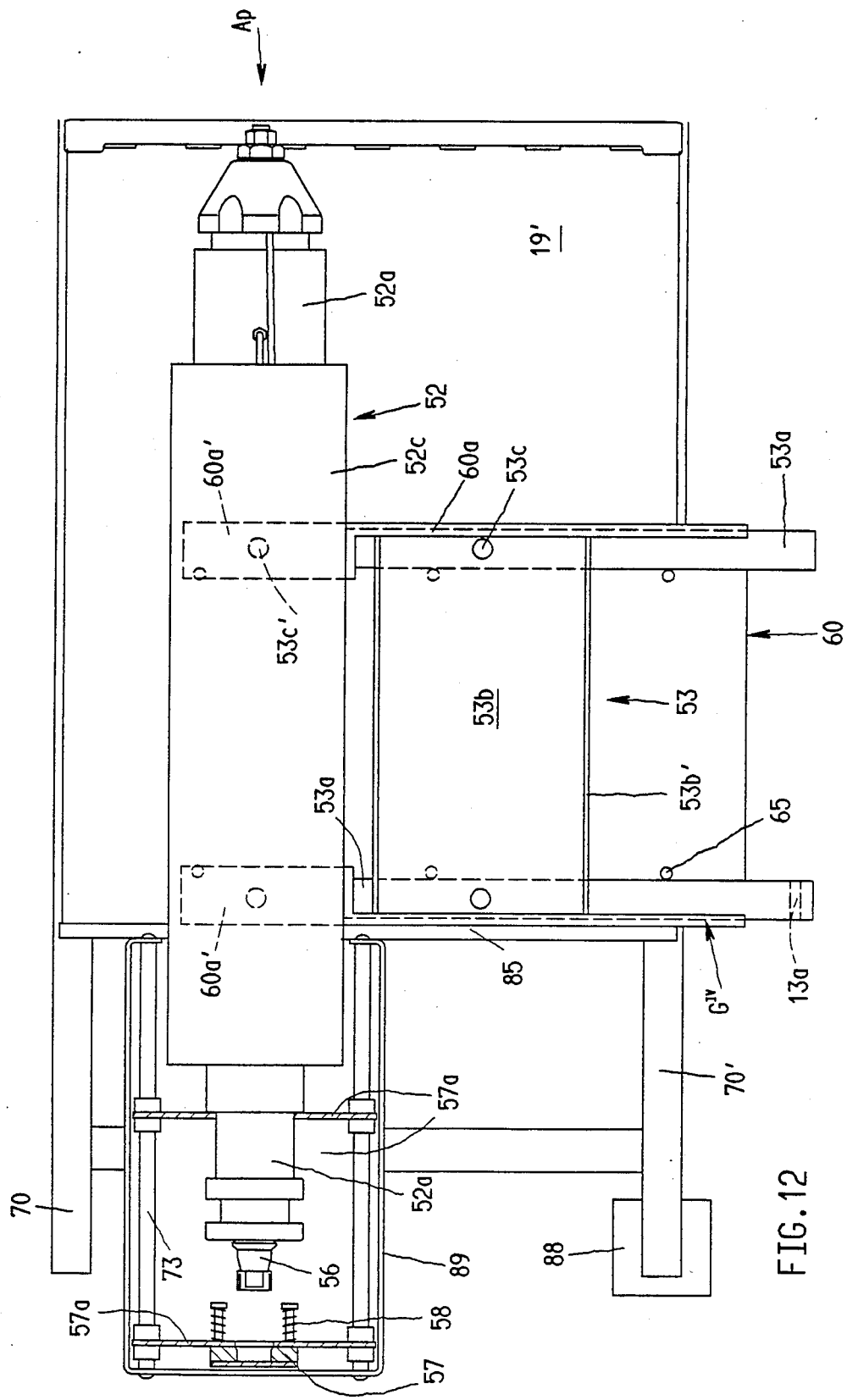
FIG. 12 is a top plan view on an enlarged scale of one part of the structure shown in FIG. 11.
Figure 13:
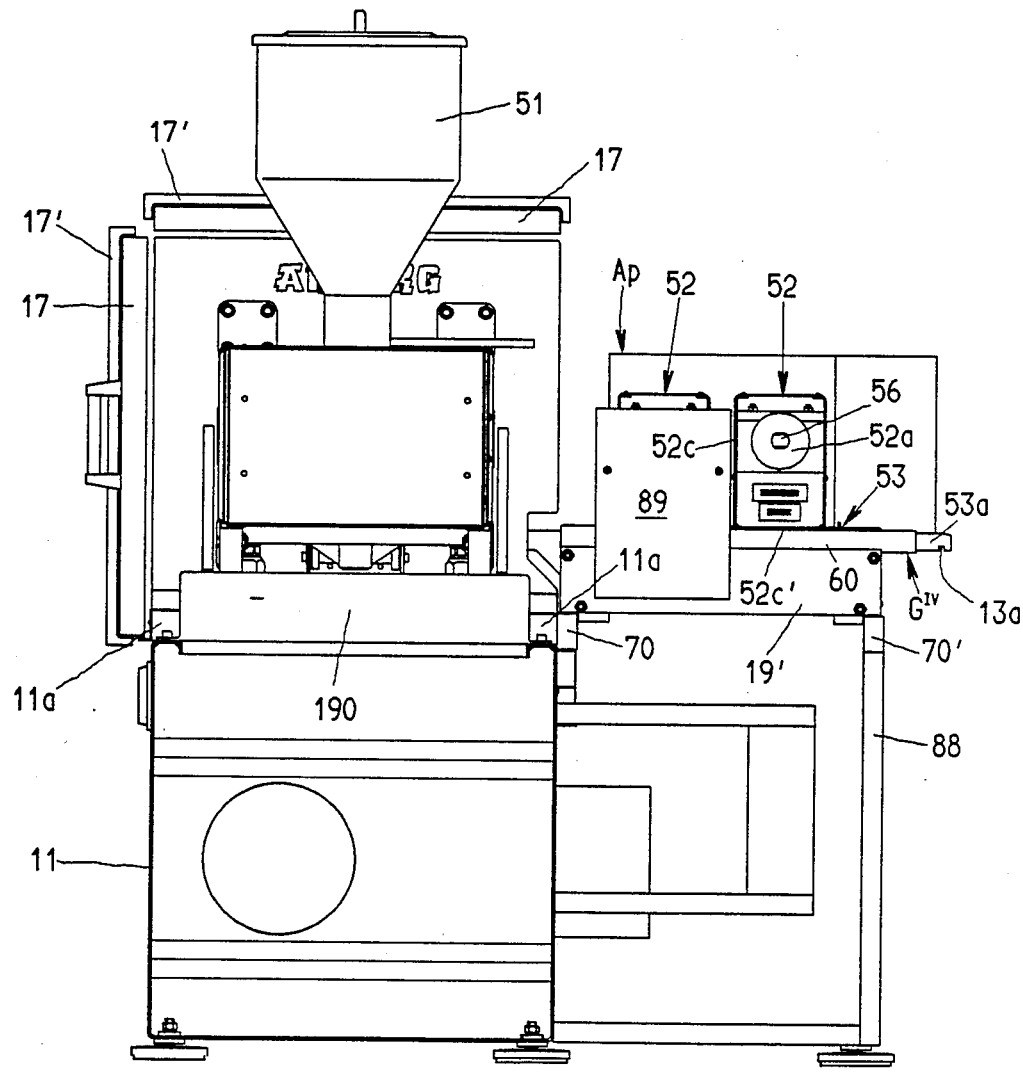
FIG. 13 is a front elevational view of the injection molding machine of FIG. 11 showing plasticizing units on the mold changing table.

That half of the extension 19' which is oriented towards the adjoining injection axis x—x is formed as a conditioning emplacement Ap for a plasticizing unit 52. The latter is, in a program-controlled manner, movable from its deposited position in the injection molding machine selectively over the conditioning emplacement Ap or the pallet 52 received in the mold guide G and may be deposited there in a centered manner in a axial position which corresponds generally to the axial orientation in its withdrawn, deposited position in the injection molding machine. As it may be observed particularly in FIG. 12, the profiled sheet metal component 60 which forms the mold guide $G^{IV}$ extends substantially over the entire conditioning emplacement Ap. The upper horizontal portion of the twice-crimped edge 60a straddling the engagement plate fragments 53a is multiply enlarged in the part 60a' of the conditioning emplacement Ap. The plasticizing unit 52 situated in the conditioning emplacement Ap thus rests on the enlarged horizontal portion 60a' of the twice-crimped edge 60a. In the conditioning position the plasticizing unit 52 is centered with the aid of centering pins 53c' of the enlarged section 60a'. The centering pins 53c' extend into corresponding centering holes of the support surface 52c' of the rectangular protecting tube 52c of the plasticizing cylinder 52. As also seen in FIG. 12, the engagement plate fragments 53a of the pallet 53 which are guided inside the crimped edge 60a, also extend beyond the portion 60a', that is, substantially beyond and away from the conditioning emplacement Ap.

As particularly well seen in FIGS. 15 and 16, each conditioning emplacement Ap is provided with a horizontal hydraulic cylinder 90 supported in the respective extension 19'. The hydraulic cylinder 90 is at its rear portion secured to a U-shaped sheet metal frame 89 which is rigidly connected with the extension 19' of the respective mold changing table 19. With the aid of the hydraulic cylinder 90 a coupling part 55 may be moved against the force of springs 58 into a coupling position in which plugs 55a of the coupling part are received in resiliently supported sockets 75 of the plasticizing unit 52 in a contacting manner. In the coupling part 55 there are gathered the coupling terminals 54 of the supply conduits for the plasticizing unit 52. An engagement plate 57 is rigidly connected by a carrier element 57a with the coupling part 55. The carrier element 57a is formed of a sheet metal component bent into a U-shaped configuration in a direction transversely to the plane of FIGS. 15 and 16. The vertical legs of the carrier element 57a are, for stabilizing purposes, guided in horizontal guide rods 73. Coil springs 58 are mounted on carrier pins which are axially movable relative to the engagement plate 57 when the carrier pins engage the plasticizing cylinder 52a. When the coupling part 55 is in its coupling position, the plate 57a is situated at the free rearward end of the conveyor screw 56 under the buffer effect of the biased springs 58. By virtue of such an engagement, the conveyor screw 56 in the plasticizing cylinder 52a remains essentially in its axial position despite the preheating during the preconditioning and the heat expansion of the thermoplastic material in the plasticizing cylinder. In this manner, a rearward escape of the thermoplast is prevented.

As seen in FIGS. 7–10 and 18–21, the mold changing apparatus according to the invention is operative irrespective of whether the injection molding machines of the group are of different dimensions or are identically constructed. In the case the injection molding machines are of the same size, the injection axes x—x of the injection molding machines situated on the one and the other side of the guide 45 are arranged coaxially to one another. Injection molding machines of different dimensions are situated at different distances from vertical symmetry plane y—y of the carriage track 45 in such a manner that the longitudinal edges k of the mold changing tables of the injection molding machines of unlike size are approximately at the same distance from the plane y—y. Stated differently, it is of importance for the operability of the apparatus that the coupling organs (transverse grooves 13a) oriented towards the transport carriage 27 of the molds S positioned on the emplacements A, B of the mold changing table 19 are at identical distances from the plane y—y. The same applies to the transverse grooves 13a (oriented towards the transport carriage 27) of the engagement plate fragments 53a of the pallet 53 carrying a plasticizing unit 52 and received on the extension 19' of the mold changing table 19 in a predetermined position in the mold guide $G^{IV}$. The same also applies for those transverse grooves of a mold deposited in a mold storage compartment 44a which are oriented towards the carriage track 45 or a pallet 53 situated in such storage compartment and constituting a transport unit E with a plasticizing unit 52. If the above-described conditions are met, on the smaller mold changing tables 19 of the smaller injection molding machines shorter conveyor chains 20 may be used without adversely affecting the operation of the mold changing apparatus as long as the mold or, as the case may be, the transport unit E is, on the conveyor track, coupled to a sole carrier 20a of the conveyor chain 20. The illustration in FIG. 7 depicts the moment when a mold S is taken over from the mold changing table 19 by the transport carriage 27 via the mold guide G', G" after the mold changing table 19, together with the mold S taken previously from the clamping space F, has travelled a distance corresponding to a mold width. In this position of the mold changing table 19 the earlier-conditioned mold S' is moved by the mold changing table 19 into the mold clamping space F (this has already occurred in the situation depicted in FIG. 7).

According to the operational phase shown in FIG. 8, the transport carriage 27 is in a coupling position for transferring the replaced mold S on the transport track formed of the mold guide G" and G''' into a storage compartment 44a. In the position depicted in FIG. 8 such event has not yet occurred.

In the operational phase shown in FIG. 9, the mold to be replaced has been moved into the adjoining storage compartment 44a. The transport carriage 27 has been moved into a coupling position for transferring a mold S' from a mold storage compartment 44a. FIG. 9 shows the phase when the mold S' to be transferred executes its transporting motion.

According to the illustration in FIG. 10, a mold S has been transferred from the transport carriage 27 situated in the coupling position, on the transport track G", G' into a conditioning emplacement of the mold changing table 19 and is undergoing conditioning (preheating). The mold S' to be replaced and situated in the clamping space F is ready for being transferred onto the mold changing table 19.

In the illustration according to FIG. 18, a transport unit E is being transferred on a linear transport track T" formed of mold guides G", $G^{IV}$ from the extension 19' onto the transport carriage 27.

According to the illustration in FIG. 19, the transport carriage 27 is in a coupling position for providing a transport track G", G'''. The transport unit E is ready for being transferred into a storage compartment 44a. The position of the transporting unit E transferred into the storage compartment 44a is illustrated in phantom lines.

The illustration of FIG. 20 shows the moment when a transport unit E is transferred from another storage compartment 44a onto the transport carriage 27.

According to the illustration in FIG. 21, the transport carriage 27 is in coupling position for transferring a transport unit E, formed of a pallet 53 and a plasticizing unit 52, onto the extension 19' of the mold changing table 19 of the associated injection molding machine.

In the illustrated embodiment the mold guide G in the mold clamping space F is formed by support elements 18 of both mold carriers 12, 28 and by the clamping faces of the two mold carriers 12, 28. The mold guide on the mold changing table 19 is, as may be observed particularly in FIG. 2, formed by a guide strip 19a situated between the two flights of each conveyor chain 20 and by a guide strip 19b which is at a distance from the guide strip 19a and which corresponds to the thickness of a clamping plate 41 forming part of a mold S. The mold guide G" of the transport carriage 27 is formed by guide strips 19a and 19b. These guide strips are components of the hydraulically axially displaceable mold shifting device which is movable with or without coupled mold S or transport unit E into the "standby-for-coupling" position. The mold guide G''' in the storage compartments 44a is formed by the support rollers 62', the guide strips 44f and the support strips 44d.

The mold guide $G^{IV}$ on the extension 19' is formed by the crimped edges 60a of a sheet metal member 60. For supporting the molds S or, as the case may be, the transport units E during their conveyance, there are provided low-friction means such as support rollers 62 both at the transport carriage 27 and the mold changing tables 19.

In FIGS. 5, 5a and 5b there are shown sequential positions of the transfer of a mold S from the transport carriage 27 into a mold storage compartment 44a. FIG. 5 depicts the position of the conveyor chain 20 of the mold shifting device of the transport carriage 27, assumed after the transport carriage 27 has been moved along the mold changing tables 19 in the coupling position at the storage compartment 44a. FIG. 5a depicts the moment when the shift for the standby position has just been completed, that is, the conveyor chain 20 has been hydraulically shifted into the "ready-for-coupling" position. In the illustrated arrangement, however, such a shift does not result in a "ready-for-coupling" state, but an advance of the starting point in which the shift of the mold with the aid of the transport chain 20 to ensure that the mold S arrives in the required terminal position in the storage compartment 44a as shown in FIG. 5b.

In FIGS. 7-10, 49 and 50 designate stations for moving away the molds S and collecting containers 48.

Turning now to the embodiment illustrated in FIGS. 22-38, a transporting mold changing table 127 has all the essential characteristics of the mold changing table 19 and the transport carriage 27 of the first embodiment described in conjunction with FIGS. 1-21.

Figure 22:
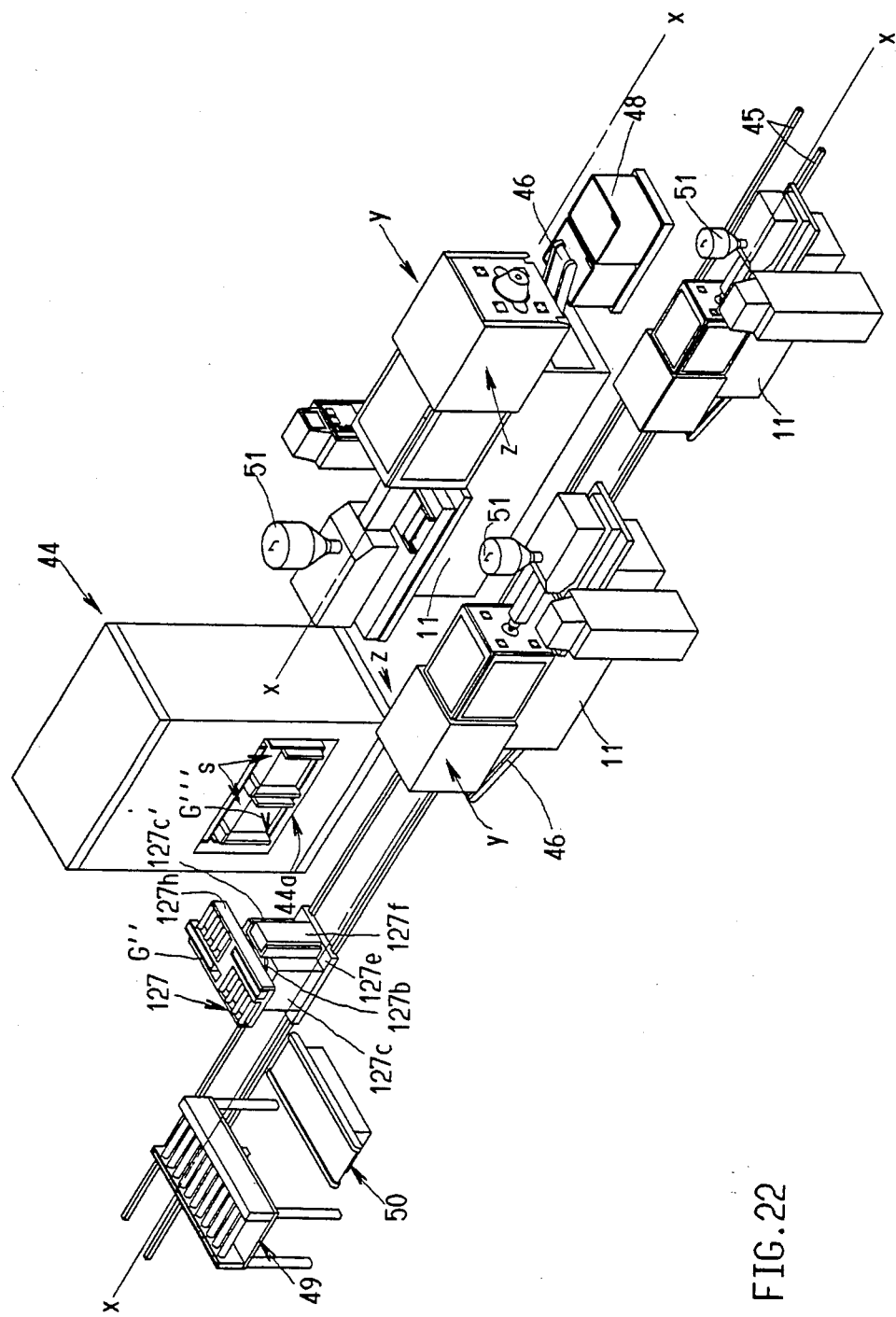
FIG. 22 is a schematic perspective view of a second preferred embodiment of the mold changing apparatus according to the invention, shown with a group of injection molding machines.
Figure 23:
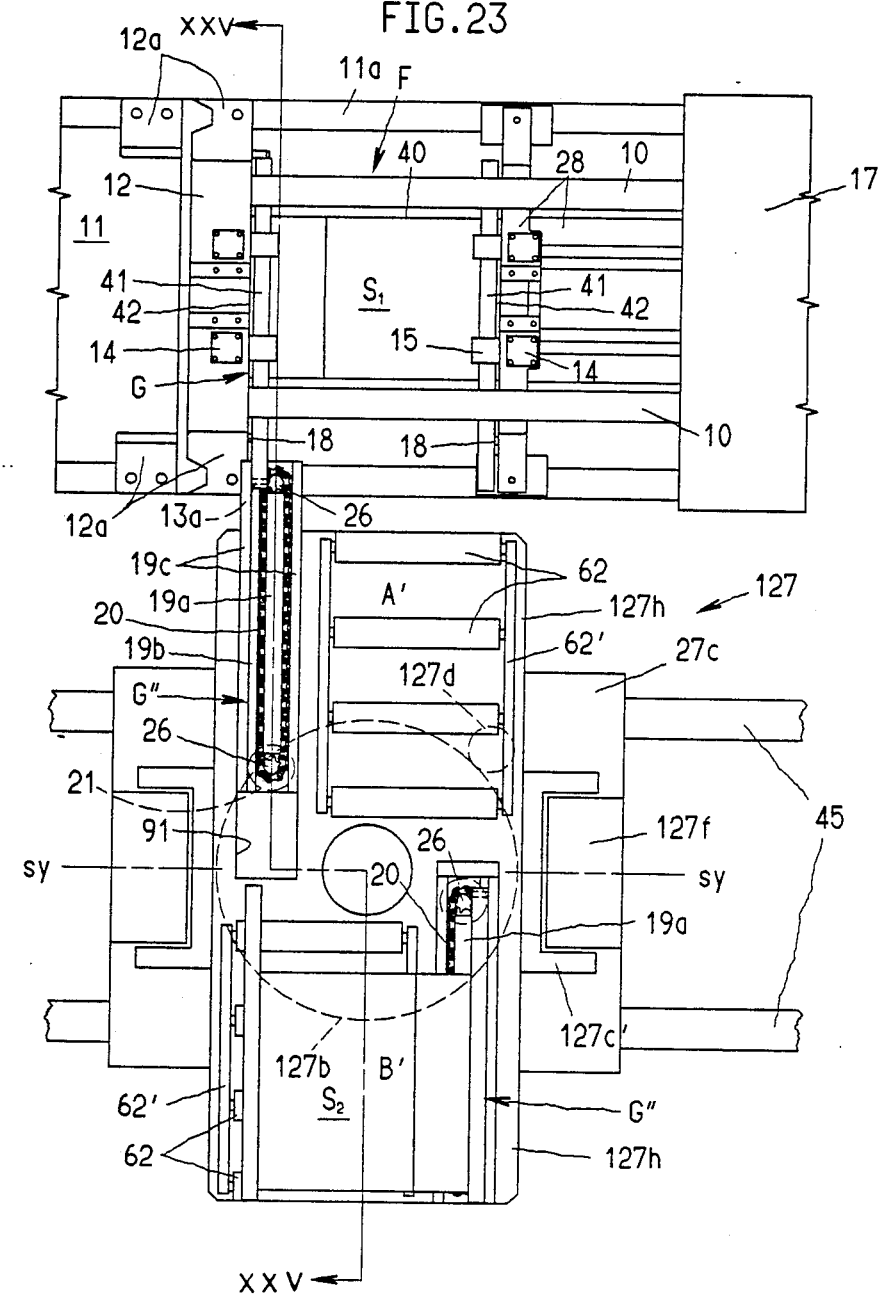
FIG. 23 is an enlarged top plan view of a part of the second embodiment in the zone of the transport track between the clamping space of an injection molding machine and a transporting changing table.
Figure 24:
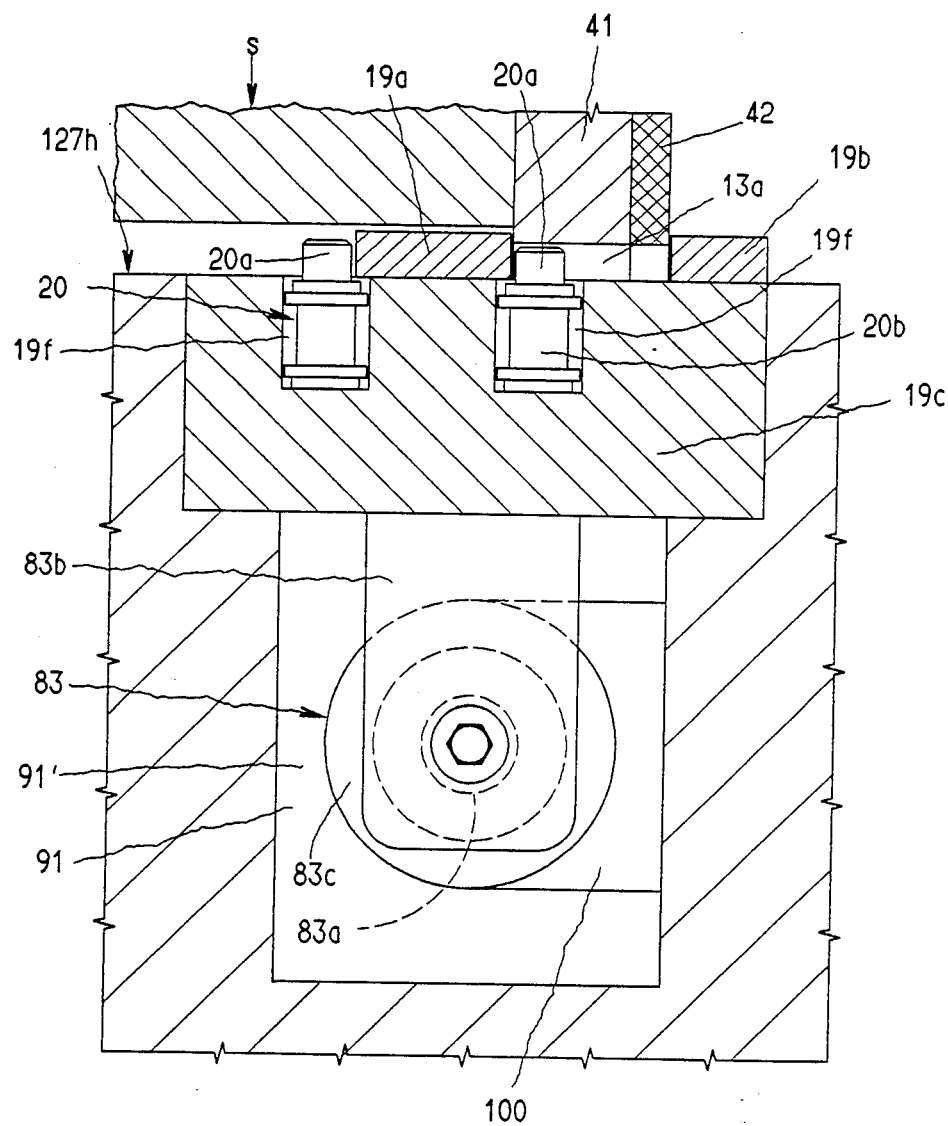
FIG. 24 is a sectional view taken along line XXIV—XXIV of FIG. 30 on an enlarged scale.
Figure 25:
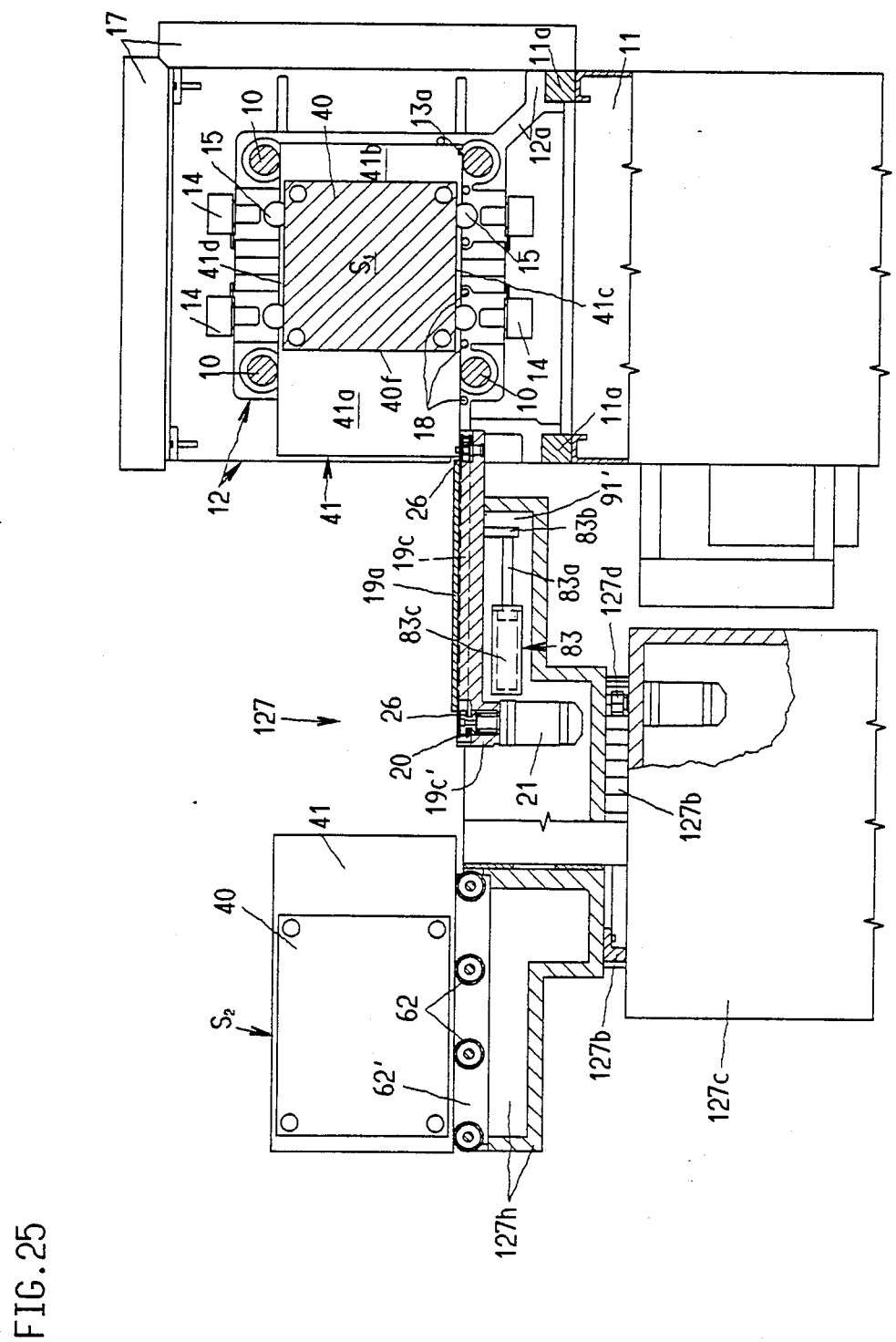
FIG. 25 is a sectional view taken along line XXV—XXV of FIG. 23.
Figure 30:
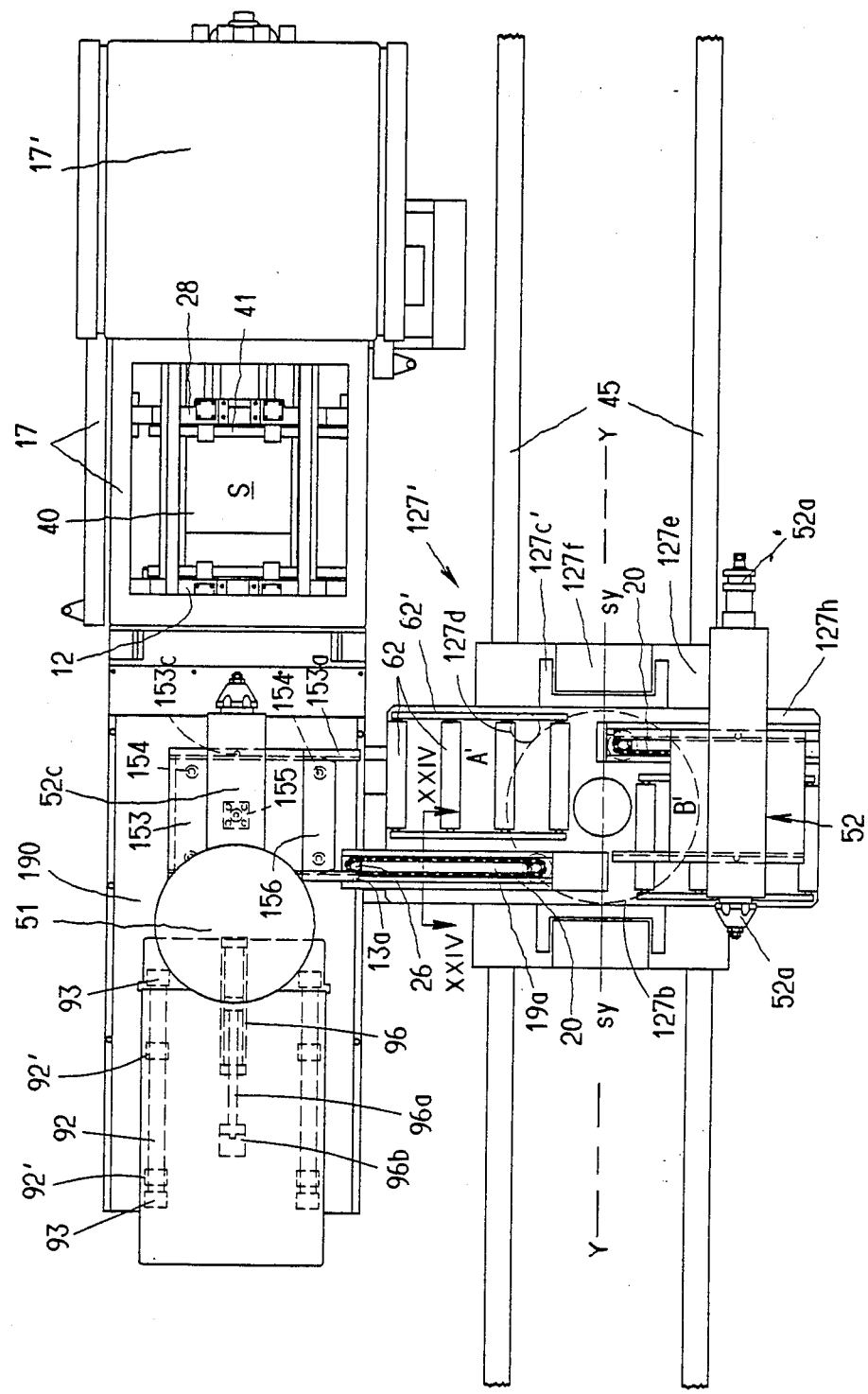
FIGS. 30 and 31 are top plan views of an injection molding machine associated with the component changing apparatus according to the second preferred embodiment of the invention, showing two operational positions during the replacement of a plasticizing unit.
Figure 31:
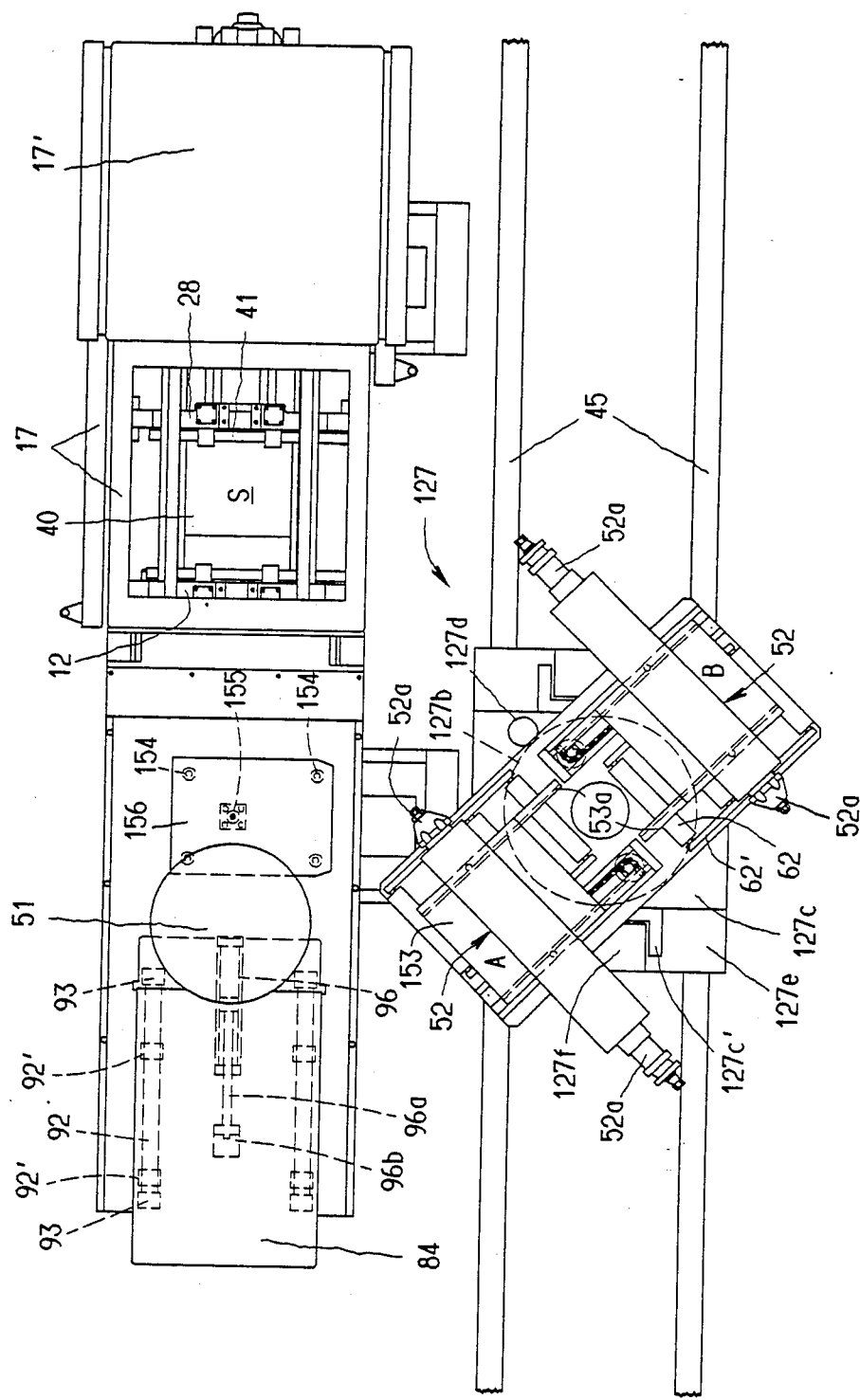

Referring in particular to FIGS. 22, 30 and 31, the component corresponding in structure and function to the mold changing table 19 of the first embodiment illustrated in FIGS. 1-21 is formed by a carrier plate 127h which may be rotatable about 180° and which forms part of the transporting mold changing table 127. On the carrier plate 127h there are arranged two emplacements A, B on either side of and symmetrically to the vertical symmetry plane y—y of the carriage guide 45. The mold guides G" (formed by the conveyor chains 20) of the mold shifting devices associated with each emplacement A, B may be moved, by rotating the carrier plate 127h, alternately in the coupling positions at the mold guide G of the clamping space F and the mold guide G''' of a storage compartment and the guide (pallet guide $G^{IV}$) in an injection molding machine. During mold replacement or, as the case may be, during the replacement of a plasticizing unit, there is thus one storage emplacement available for supplying or receiving the component, while the other emplacement is available for receiving or, respectively, supplying the component in a manner described before. All these functions can also be performed by the transporting mold changing table 127 according to the second embodiment illustrated in FIGS. 22–38. The transporting mold changing table 127, however, also assumes the functions of the transport carriage 27 by cooperating in a linear guide with all injection molding machines on either side of the guide and the mold magazine. It is noted that the combination of known functions of the mold changing table with the known functions of the transport carriage is known by itself as disclosed, for example, in German Offenlegungsschrift (non-examined published patent application) No. 3,220,911. In the known arrangement, however, the two emplacements with the associated mold shifting devices and mold guides are displaceable only in a single linear motion of the mold changing table into the coupling position parallel to the injection axis x—x. The emplacements are situated side-by-side with respect to the direction of the injection axis, that is, not on either side of the guidance of the transport carriage or the mold changing table. As a result, in the prior art arrangement only those injection molding machines can be served by the mold changing apparatus which are all on one side of the mold changing table.

The construction and function of the embodiment shown in FIGS. 22–38 correspond to those of the embodiment illustrated in FIGS. 1–21 and thus in the description which follows only characteristics of the second embodiment will be described which are in addition to those of the first embodiment.

The transporting mold changing table 127 has two mold emplacements A', B' (FIGS. 23, 30), each being provided with a mold guide G" and a mold shifting device. Each of the latter engages into a coupling member (transverse groove 13a) of the mold S. The vertical symmetry plane sy—sy of the transporting mold changing table 127 coincides with the vertical symmetry plane y—y of the guide 45.

The mold changing table is linearly guided by means of a foot plate (platform) 127e in two rails which are mounted on the floor and which constitute the guide 45. In the platform 127e there are anchored two vertical columns 127f which are symmetrical to the symmetry plane sy—sy of the guide 45. On the columns 127f there is vertically guided a block-like housing sled 127c by means of U-rails 127c'. A carrier plate 127h having an approximately rectangular outline is supported for rotation about 180° on the sled 127c and is turnable by means of a rotary disc 127b. In the carrier plate 127h there are provided the mold guides G" which are identical to one another and are in mirror symmetry to the symmetry plane sy—sy and the associated mold shifting devices as may be particularly well seen in FIGS. 23 and 30. In the carriage 127c there is mounted the computer which controls the replacement of the molds S and the plasticizing units 52. A vertically oriented rotary drive shaft of a motor mounted in the sled 127c meshes by means of a pinion 127d with a ring gear of the rotary disc 127b. The two mold emplacements A', B' situated on the carrier plate 127h of the transporting mold changing table 127 are arranged on either side of and in mirror symmetry with respect to the symmetry plane y—y of the guide 45 or the symmetry plane sy—sy of the transporting mold changing table 127. The emplacements are thus at different distances from the injection axis x—x of the injection molding machine to which the mold changing table is momentarily coupled. The mold shifting devices comprising the mold guides G" and the conveyor chains 20 are situated in each instance at one side of (thus asymmetrically to) the emplacement A' or B', respectively. It is accordingly possible that the two mold guides G", as a result of a rotation of the carrier plate 127h about 180°, alternately form a transport track G", G with the mold guide G of the clamping space F according to FIG. 27, a transport track G", G''' with the mold guide G''' of a storage compartment 44a and a transport track G", $G^{IV}$ with a mold guide (pallet guide $G^{IV}$) of an injection molding machine. As may be observed in FIGS. 30–38, the pallet guide is arranged at the injection molding machines approximately at the center of gravity of the plasticizing unit 52 and is oriented transversely to the respective injection axis x—x. On the pallet guide $G^{IV}$ there is displaceable a pallet 153 which carries a plasticizing unit 52 and which has an engagement plate fragment 153a and a coupling organ (transverse groove 13a) which, to a certain measure, emulates the engagement plate 41 and the coupling organ (transverse groove 13a) of a mold S. In this manner, it is feasible to replace by the mold changing apparatus also the plasticizing units 52 as the latter are each coupled with a pallet 153 to a transport unit which is, for the replacement operation, that is, for transporting and storing, handled identically to a mold S.

Figure 32:
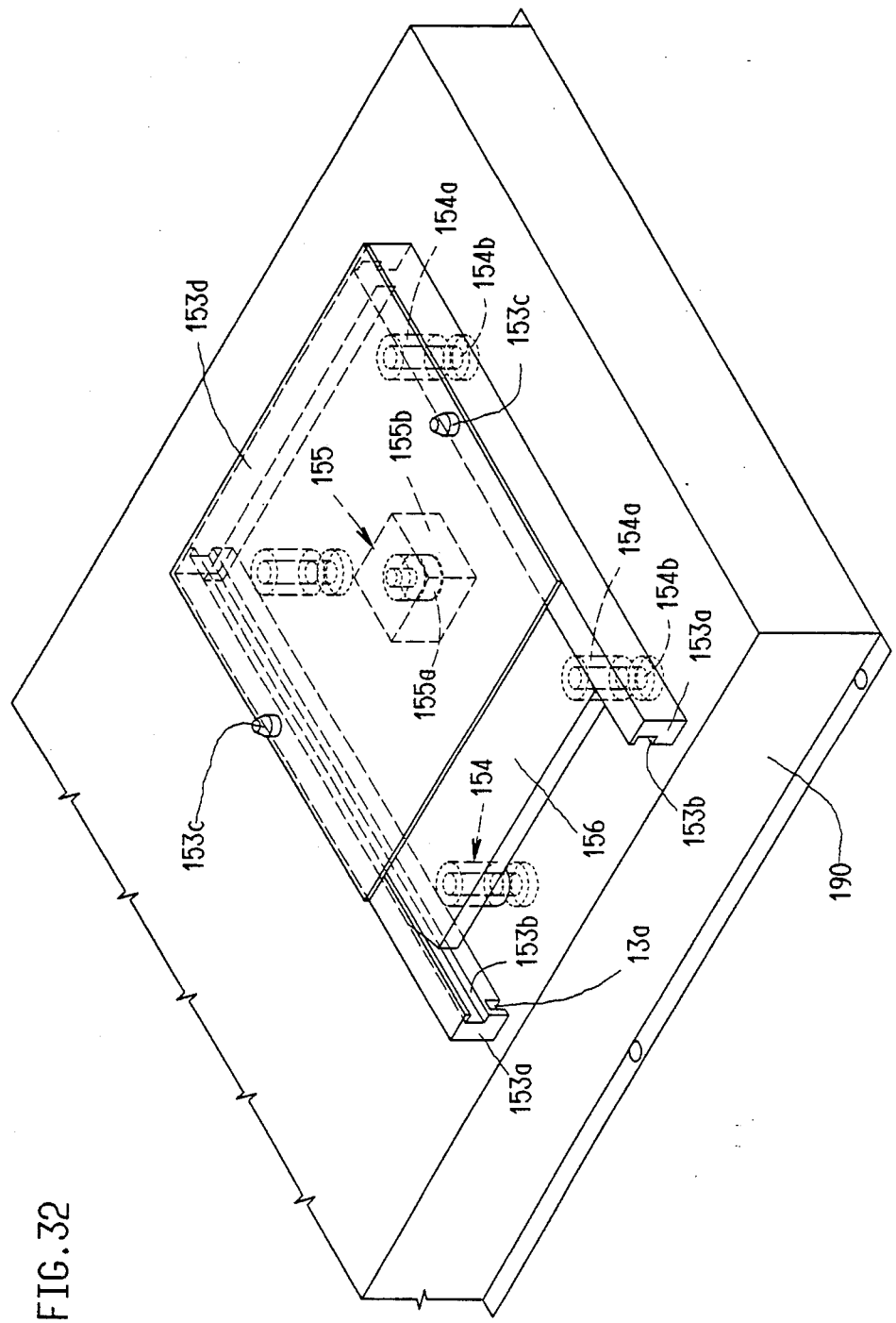
FIG. 32 is a perspective view of a transporting pallet with associated pallet guide forming part of the second preferred embodiment of the invention.
Figure 33:
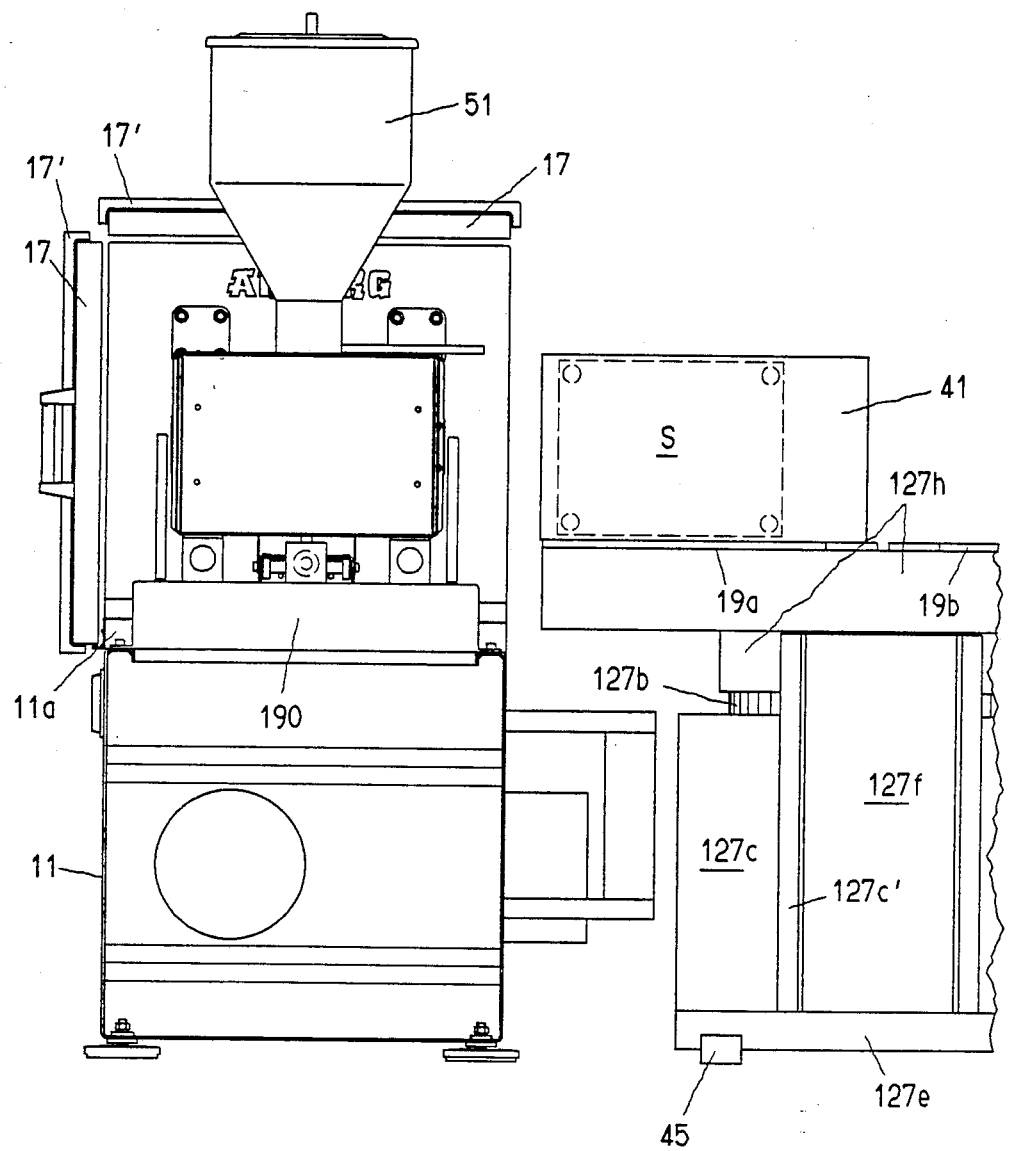
FIG. 33 is a front elevational view of the construction shown in FIG. 31, illustrated with a mold on the transporting changing table.
Figure 34:
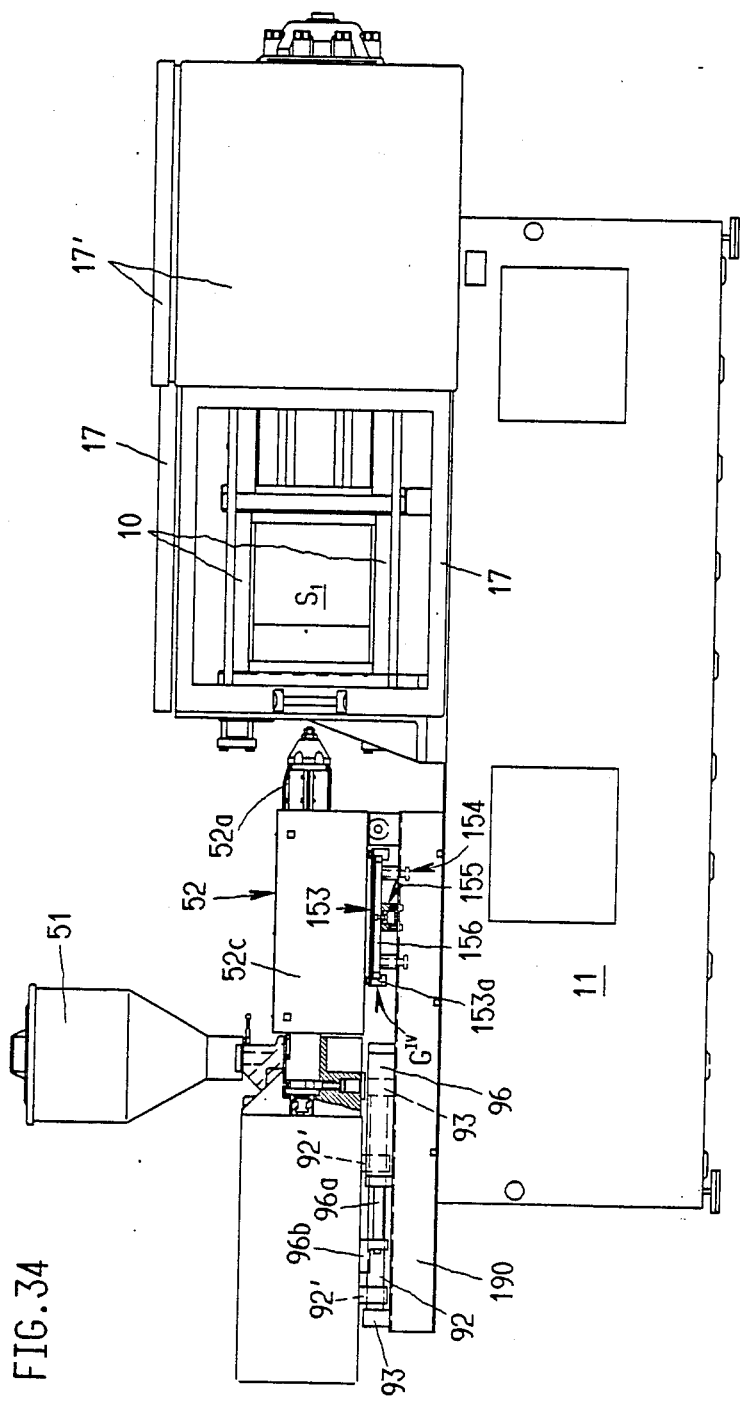
FIG. 34 is a side elevational view of the injection molding machine shown in FIG. 31.

The construction of the pallet 153 and an associated pallet guide $G^{IV}$ for transferring a transport unit from the injection molding machine ont the mold changing table 127 is illustrated in particular in FIG. 32, taken in conjunction with FIGS. 30 and 34. The mold guide $G^{IV}$ is formed by a horizontal guide plate 156 which is arranged on a pedestal 190 of the machine bed 11 and which may be vertically shifted between limits. The device for vertically shifting the horizontal guide plate 156 comprises vertical pins 154b which are secured on the pedestal 190. On the pins 154b there are shiftably supported concentric bushings 154a of the guide plate 156. For a limited vertical shifting of the guide plate 156 which serves as the mold guide $G^{IV}$ there is provided a central hydraulic cylinder unit 155 which is situated underneath the guide plate 156 and which is supported on the pedestal 190. The hydraulic cylinder unit 155 comprises a block-like stationary cylinder 155b whose piston 155a exerts a force on the guide plate 156 by means of a piston rod.

The pallet 153 is formed by the two parallel engagement plate fragments 153a (each of which emulates an engagement plate 41 of a mold S) and a connecting plate 153d which connects the two engagement plate fragments 153a with one another. In the illustrated embodiment there is shown only one of the two engagement plate fragments 153a with only one transverse groove 13a functioning as the coupling organ. Both engagement plate fragments 153a are on their facing vertical longitudinal edges provided with guide grooves 153b into which extend the longitudinal edges of the associated guide plate 156. The longitudinal edges thus form the mold guide $G^{IV}$ proper which may form a transport track G", $G^{IV}$ with the mold guide G". With the aid of the pallet 153 a plasticizing unit 52 thus may be transported on the transport track G", $G^{IV}$ from its lowered, deposited position in the injection molding unit onto the adjoining emplacement A' or B' and conversely.

The mold shifting devices associated with the two mold emplacements A' and B' are constructed identically to the first embodiment described in conjunction with FIGS. 1–21. Likewise, the significance of the shifting motion caused by the mold shifting device and designated as "shift-for-standby" is described in detail in connection with the embodiment illustrated in FIGS. 1–21.

The coupling organs (transverse grooves 13a) of the molds S or pallets 153 situated in the clamping spaces F or the storage compartments 44a (in the pallet guides $G^{IV}$) are at identical distances from the vertical symmetry plane y—y. As it is particularly well seen in FIGS. 30 and 34, the injection molding unit is axially displaceable with the aid of a hydraulic cylinder 96. The injection molding unit is guided on beams 92 which are secured to the pedestal 190 of the machine bed 11 by means of bearing components 93. Upon axial displacement the sockets carrying the injection molding unit slide on the beams 92. The hydraulic cylinder 96 secured to the pedestal 190 engages the injection molding unit with the piston rod 96a with the aid of a coupling member 96b.

The replacement of a mold S or a plasticizing unit 52 with the second embodiment illustrated in FIGS. 21–38 will now be described with particular reference to FIGS. 27–29 and 36–38.

In the operational phase depicted in FIG. 27 a mold $S_1$ to be replaced is just being transferred from the clamping space F of an injection molding machine onto an empty, adjacent emplacement of the mold changing table 127 situated in a coupling position. A mold $S_2$ to be inserted is situated on the rear emplacement of the mold changing table and has been placed there previously from the magazine 44.

FIG. 28 shows that by virtue of a rotation of the mold changing table 127 by 180° the mold $S_1$ now on the frontal emplacement of the mold changing table 127 may attain a position occupied previously (as shown in FIG. 27) by the mold $S_2$ while the latter is now in a position occupied previously by the mold $S_1$.

FIG. 29 shows a phase of the mold changing operation where the mold $S_2$ has already reached the mold clamping space F from the adjacent emplacement of the mold changing table 127, and the latter has been propelled into a coupling position at an empty storage compartment 44a and its carrier plate 127h has been rotated through 180°. On a conveyor track T' formed by the mold guide G''' of the storage compartment 44a and the adjacent mold guide G'' of the mold changing table 127 the mold $S_1$ may be shifted into the mold storage compartment 44a.

In FIG. 36 there is depicted a phase in which a transport unit (including a plasticizing unit 52) is transferred from an injection molding machine to the adjoining empty emplacement of the mold changing table 127 and to a transport track T''. In the rear emplacement of the mold changing table 127 there is situated a transport unit 52' which has been taken from the magazine 44.

FIG. 37 depicts the phase when the plasticizing unit 52' to be inserted for operation is, by virtue of rotating the carrier plate 127h of the mold changing table 127, brought into a position which corresponds to the position previously occupied by the plasticizing unit 52 (FIG. 36), now situated on the rear emplacement of the mold changing table.

FIG. 38 shows an operational phase of the changing operation of the plasticizing unit wherein the new plasticizing unit 52' has arrived into the injection molding machine, the mold changing table 127 is in a coupling position at a mold storage compartment 44a and the carrier plate 127h has again been rotated through 180°. The Figure shows the moment when the plasticizing unit 52 now to be stored in the magazine 44 is being transferred into a storage compartment 44a.

In FIGS. 26, 26a and 26b there are shown sequential operational phases of the transfer of a mold S from the mold changing table 127 into a mold storage compartment 44a.

According to FIG. 26, the mold S is situated on its emplacement in a position adapted for travel of the mold changing table on the guide 45. In FIG. 26a the shift bar 19c which constitutes an organ combined in one unit of the mold shifting device, has been shifted from the rearward position of rest in the frontal standby-for-coupling position together with the mold coupled to the conveyor chain 20. It is only in this position that the conveyor chain 20 is set in motion so that the mold, as seen in FIG. 26b, is placed into the determined orientation into the mold storage compartment 44a.

The present disclosure relates to subject matter contained in Federal Republic of Germany Patent Applications No. P 36 17 094.1 (filed May 21, 1986) and No. P 36 26 488.1 (filed Aug. 5, 1986) which are incorporated herein by reference.

It will be understood that the above description of the present invention is susceptible to various modifications, changes and adaptations, and the same are intended to be comprehended within the meaning and range of equivalents of th appended claims.

What is claimed is:

1. In a mold changing apparatus serving a group of injection molding machines for replacing and storing components thereof; each injection molding machine having an injection axis and including a mold clamping unit having means for defining a clamping space for accommodating a mold in a working position; a first mold guide situated in the clamping space for supporting the mold for a horizontal displacement into and out of the clamping space in a direction transversely to the injection axis; an injection molding unit separable from said mold clamping unit; said injection molding unit including a plasticizing unit separable from said injection molding unit; said mold and said plasticizing unit each constituting one of said components of each injection molding machine; a separate mold changing table associated with each injection molding machine and defining two adjacent mold emplacements each being adapted to hold a separate mold; two second mold guides mounted on each said mold changing table adjacent each said emplacement for supporting the mold for a horizontal displacement into and out of the respective emplacement of the mold changing table; each said mold changing table being arranged for a horizontal shifting motion parallel to said injection axis into adjacent first and second positions for forming a first transport track with the first mold guide and one of the two second mold guides, respectively; first mold shifting devices mounted on each mold changing table for moving a mold from an emplacement into the clamping space on said transport track and conversely in a direction transverse to said injection axis; said component changing apparatus including a storage magazine including a plurality of storage compartments, and a transporting device arranged for carrying components from respective said mold changing tables to respective said storage compartments and conversely; the improvement wherein said transporting device comprises a transport carriage and a carriage track oriented parallel to the injection axis of each said injection molding machine for guiding the transport carriage at ground level between said magazine and a selected said injection molding machine; the improvement further comprising (a) a platform mounted on said transport carriage for rotation through at least 180° about a vertical axis; said platform defining an emplacement for holding a mold to be carried by said transport carriage;

(b) a third mold guide mounted on said platform for guiding the mold for a horizontal displacement into and out of the emplacement of said platform;

(c) a fourth mold guide mounted in each storage compartment for supporting the mold for a horizontal displacement into and out of a respective said storage compartment;

(d) a second transport track formed together by an alignment of said second and third mold guides and a third transport track formed together by an alignment of said third and fourth mold guides when said transport carriage is in a coupling position adjacent one of said mold changing tables or said magazine, respectively; and (e) a second mold shifting device mounted on said transport carriage for moving a mold between one of said storage compartments and the emplacement of said transport carriage or between the emplacement of said transport carriage and an emplacement of one of said mold changing tables, dependent on a coupling position of said transport carriage.

2. A mold changing apparatus as defined in claim 1, further comprising mean for adjusting a height level of said transport carriage.

3. A mold changing apparatus as defined in claim 1, further comprising a plurality of support rollers defining said storage compartments; means for moving said compartments in an endless vertical path and a discharge and input opening defined in said magazine, situated at an approximate height level corresponding to a average height of all said mold changing tables; a selected one of said compartments being alignable with said discharge and input opening of said magazine.

4. A mold changing apparatus as defined in claim 1, wherein said platform is formed of a rotary carrier plate.

5. A mold changing apparatus as defined in claim 1, wherein said carriage track has a vertical symmetry plane; further wherein said transport carriage has a platform, two vertical columns anchored in said platform and arranged symmetrically to the symmetry plane of said carriage track; a sled having a horizontal support plate; a horizontally oriented disc mounted on said horizontal support plate for a rotation of at least 180° about a vertical axis; a horizontally oriented carrier plate affixed to an upper face of said disc; said second mold shifting device comprising a horizontally oriented, endless chain; said endless chain and said third mold guide being mounted on said carrier plate; each said vertical column having a guide cooperating with said sled for vertically guiding said sled during vertical displacements thereof.

6. A mold changing apparatus as defined in claim 1, further comprising a belt conveyor situated adjacent said carriage track and oriented parallel to said injection axis; said carriage track having a vertical symmetry plane; said transport carriage having a support face situated symmetrically relative to said symmetry plane and adapted to receive a collecting bin for moving said collecting bin from said injection molding machines to said belt conveyor.

7. A mold changing apparatus as defined in claim 1, wherein the injection molding machines of said group are arranged on either side of said carriage track in a mirror symmetry thereto.

8. A mold changing apparatus as defined in claim 7, wherein each said mold changing table has an outer longitudinal edge oriented towards said carriage track; all the longitudinal edges being parallel to and substantially equidistant from a vertical symmetry plane of said carriage track.

9. A mold changing apparatus as defined in claim 1, furthe comprising (f) a horizontal extension forming part of each said mold changing table;

(g) a pallet adapted to support a plasticizing unit thereon and forming, together with the plasticizing unit it supports, a transport unit for movement by said transport carriage and said first and second mold shifting devices;

(h) a fifth mold guide mounted on each said extension for guiding the transport unit for a horizontal displacement onto and out of said extension; and (i) a fourth transport track formed by said third, fourth and fifth mold guides when said transport carriage is in a coupling position at said magazine.

10. A mold changing apparatus as defined in claim 9, wherein said pallet includes two engagement plate fragments including coupling organs arranged for engagement by said second mold shifting device and a support plate connecting said engagement plate fragments with one another.

11. A mold changing apparatus as defined in claim 10, further comprising an upstanding centering pin supported on said support plate; each said plasticizing unit having a lower support face including a centering hole; said plasticizing unit being liftable from an injection molding machine associated therewith and lowerable onto said pallet such that said centering hole receives that centering pin.

12. A mold changing apparatus as defined in claim 9, wherein the extension of each said mold changing table has adjoining first and second halves; said first half being closer to said carriage track than said second half; said fifth mold guide being mounted on said first half; said second half of the extension of each mold changing table defines a conditioning emplacement for a plasticizing unit.

13. A mold changing apparatus as defined in claim 12, wherein each plasticizing unit comprises a feed screw; further comprising a vertically oriented engagement plate; a horizontally oriented hydraulic cylinder unit arranged for placing said engagement plate axially adjust said feed screw; further comprising supply lines for the plasticizing unit, each supply line having coupling terminals; said hydraulic cylinder unit being arranged for controlling said coupling terminals.

14. A mold changing apparatus as defined in claim 10, wherein said first and second mold shifting devices include endless driven chains mounted on said mold changing tables and said transport carriage for engaging coupling components forming part of said mold and said pallet.

15. A mold changing apparatus as defined in claim 14, wherein each said injection molding machine includes a mold carrier situated in said clamping space and having mold clamping faces and support elements forming said first mold guide; further comprising mold guiding strips mounted on said mold changing tables and said transport carriage and forming said second and third mold guides; and a profiled sheet metal member mounted on said extension of each said mold changing table and forming said fifth mold guide.

16. In a mold changing apparatus serving a group of injection molding machines for replacing and storing components thereof; each injection molding machine having an injection axis and including a mold clamping unit having means for defining a clamping space for accommodating a mold in a working position; a first mold guide situated in the clamping space for supporting the mold for a horizontal displacement into and out of the clamping space in a direction transversely to the injection axis; an injection molding unit separable from said mold clamping unit; said injection molding unit including a plasticizing unit separable from said injection molding unit said mold and said plasticizing unit each constituting one of said components of each injection molding machine; a separate mold changing table associated with each injection molding machine and defining two adjacent mold emplacements each being adapted to hold a separate mold; two second mold guides mounted on each said mold changing table adjacent each said emplacement for supporting the mold for a horizontal displacement into and out of the respective emplacement of the mold changing table; each said mold changing table being arranged for a horizontal shifting motion parallel to said injection axis into adjacent first and second positions for forming a first transport track with the first mold guide and one of the two second mold guides, respectively; first mold shifting devices mounted on each mold changing table for moving a mold from an emplacement into the clamping space on said transport track and conversely in a direction transverse to said injection axis; said component changing apparatus including a storage magazine including a plurality of storage compartments, and a transporting device arranged for carrying components from respective said mold changing tables to respective said storage compartments and conversely; the improvement wherein said transporting device comprises a transport carriage and a carriage track oriented parallel to the injection axis of each said injection molding machine for guiding the transport carriage at ground level between said magazine and a selected said injection molding machine; the improvement further comprising a second mold shifting device mounted on said transport carriage for moving a replaceable component of a selected injection molding machine between one of said storage compartments and said transport carriage or between said transport carriage and an emplacement of one of said mold changing tables, dependent on a coupling position of said transport carriage; said second mold shifting device including an endless conveyor chain supported by end sprockets and a motor drivingly connected to said endless conveyor chain; the improvement further comprising a hydraulic drive mounted in said transport carriage and being operatively connected with said second mold shifting device for moving said second mold shifting device into a position of rest in which said endless conveyor chain is in a withdrawn state within an outline of said transport carriage and for moving said second mold shifting device into a standby-for-coupling position in which said endless chain horizontally projects beyond the outline of said transport carriage.

17. In a mold changing apparatus serving a group of injection molding machines for replacing and storing components thereof; each injection molding machine having an injection axis and including a mold clamping unit having means for defining a clamping space for accommodating a mold in a working position; a first mold guide situated in the clamping space for supporting the mold for a horizontal displacement into and out of the clamping space in a direction transversely to the injection axis; an injection molding unit separable from said mold clamping unit; said injection molding unit including a plasticizing unit separable from said injection molding unit; said mold and said plasticizing unit each constituting one of said components of each injection molding machine; said component changing apparatus including a storage magazine including a plurality of storage compartments, and a transporting device arranged for carrying components from respective said injection molding machines to respective said storage compartments and conversely; the improvement wherein said transporting device comprises a transporting changing table and a carriage track oriented parallel to the injection axis of each said injection molding machine for guiding the transporting changing table a ground level between said magazine and a selected said injection molding machine; said carriage track having a vertical symmetry plane; the improvement further comprising
  (a) a carrier plate mounted on said transporting changing table for rotation through at least 180° about a vertical axis; said platform defining two emplacements for holding said component to be carried by said transporting changing table; said emplacements being situated on either side of and symmetrically to said symmetry plane;
  (b) a separate mold shifting device positioned on said carrier plate adjacent each said emplacement for moving said components from the emplacements into the clamping space or a selected said storage compartment and conversely dependent from a coupling position of said transporting changing table along said carriage track;
  (c) second mold guides forming part of said mold shifting device for guiding the mold for a horizontal displacement into and out of said emplacements;
  (d) a third mold guide mounted in each storage compartment for supporting the mold for a horizontal displacement into and out of a respective said storage compartment; and
  (e) a first transport track formed together by said second and first mold guides and a second transport track formed together by said second and third mold guides when said transporting changing table is in a coupling position adjacent one of said injection molding machines or said magazine, respectively.

18. A mold changing apparatus as defined in claim 17, wherein said transporting changing table has a platform, two vertical columns anchored in said platform and arranged symmetrically to said vertical symmetry plane; a block-like housing sled having a horizontal support plate; a horizontally oriented disc mounted on said horizontal support plate for a rotation about a vertical axis; a horizontally oriented carrier plate affixed to an upper face of said disc; said endless chains and said second mold guides being mounted on said carrier plate; each said vertical column has cross-sectionally U-shaped guide rails cooperating with said sled for vertically guiding said sled during vertical displacements thereof.

19. A mold changing apparatus as defined in claim 17, wherein each said mold shifting device of said transporting changing table includes an endless conveyor chain supported by end sprockets and a motor drivingly connected to said endless conveyor chain; the improvement further comprising a hydraulic drive mounted in said transporting changing table and being operatively connected with each said mold shifting device for moving the mold shifting device into a position of rest in which the endless conveyor chain thereof is in a withdrawn state within an outline of said carrier plate and for moving the mold shifting device into a standby-for-coupling position in which the endless conveyor chain horizontally projects beyond the outline of said carrier plate.

20. A mold changing apparatus as defined in claim 17, further comprising (f) a pallet forming a transport unit with a plasticizing unit received thereon;

(g) a separate pallet guide associated with each said injection molding machine and oriented transversely to the injection axis thereof; and (h) a third transport track formed together by said second mold guides and said pallet guide.

21. A mold changing apparatus as defined in claim 20, wherein said pallet includes two engagement plate fragments including coupling organs arranged for engagement by each said mold shifting device and a support plate connecting said engagement plate fragments with one another.

22. A mold changing apparatus as defined in claim 21, wherein the pallet guides are formed by a guide plate having longitudinal edges; said engagement plate fragments having guide grooves receiving said longitudinal edges; and further wherein said guide plate being lowerable together with said pallet; further comprising a vertically operating hydraulic cylinder unit mounted in each injection molding machine; said hydraulic cyclinder unit being arranged for removing the plasticizing unit from said pallet upon lowering said pallet.

23. a mold changing apparatus as defined in claim 21, wherein each said mold shifting device comprises an endless conveyor chain, each supported by respective end sprockets each having a vertically oriented rotary axis; and further wherein said mold changing devices are arranged on said carrier plate in mirror-symmetry to said vertical symmetry plane.

* * * * *